Nov. 17, 1970    S. A. HEENAN ET AL    3,541,606
REFLECTORIZED VEHICLES AND REFLECTORS THEREFOR
Filed Oct. 16, 1967    10 Sheets-Sheet 1
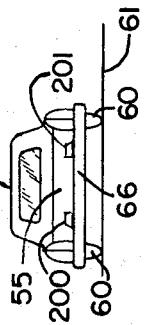
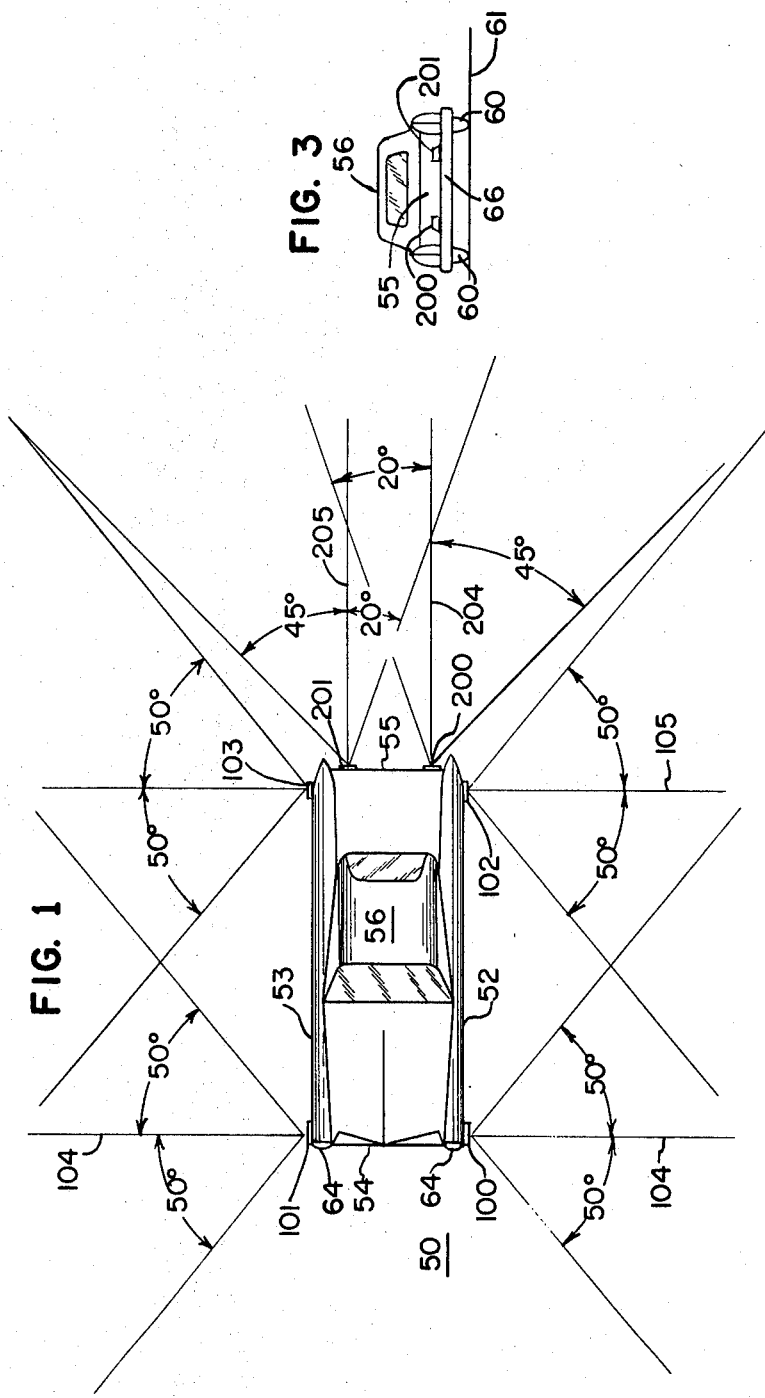
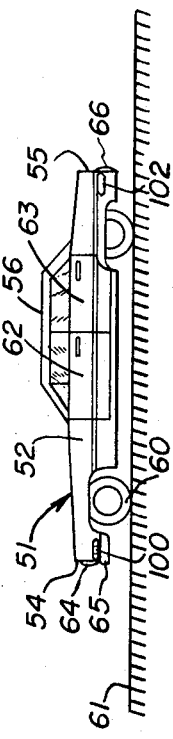
Inventors
SIDNEY A. HEENAN,
ROBERT I. NAGEL.
By
Prangley, Baird, Clayton, Miller & Vogel.
Attys.

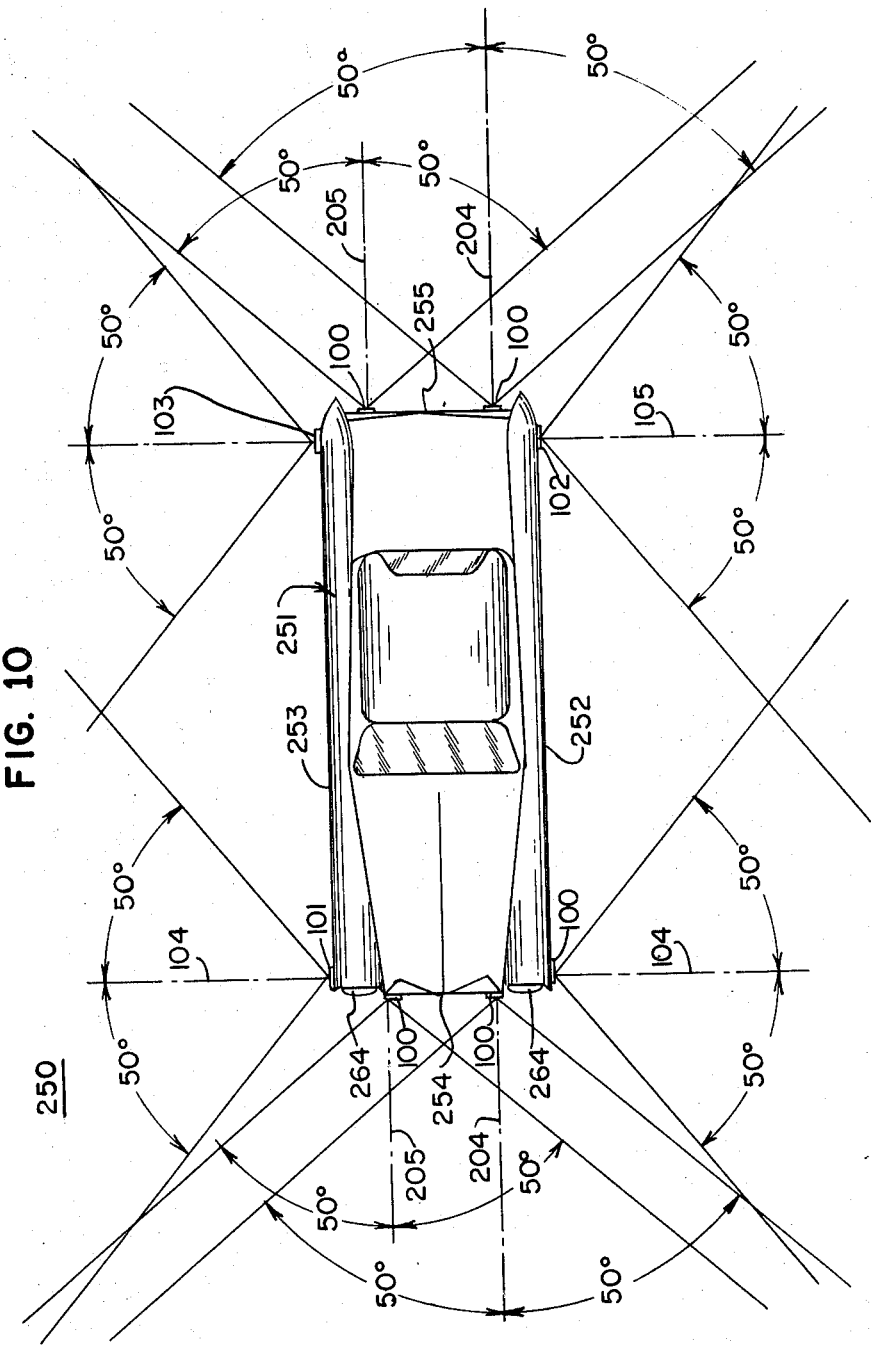

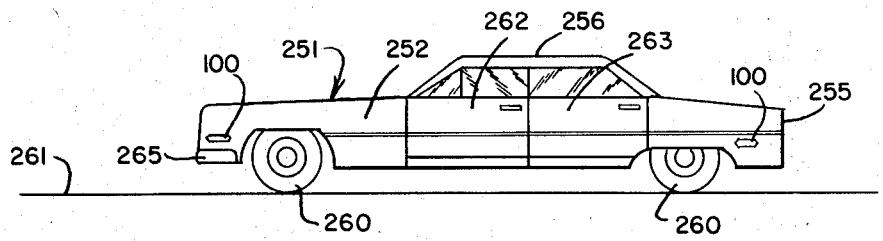
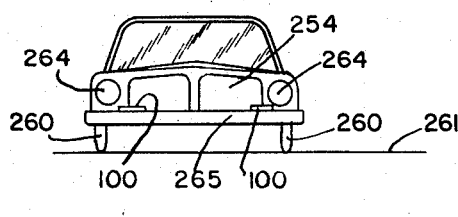
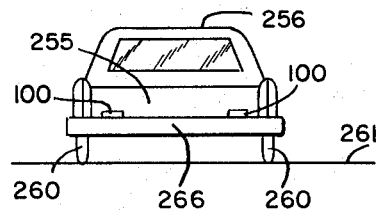
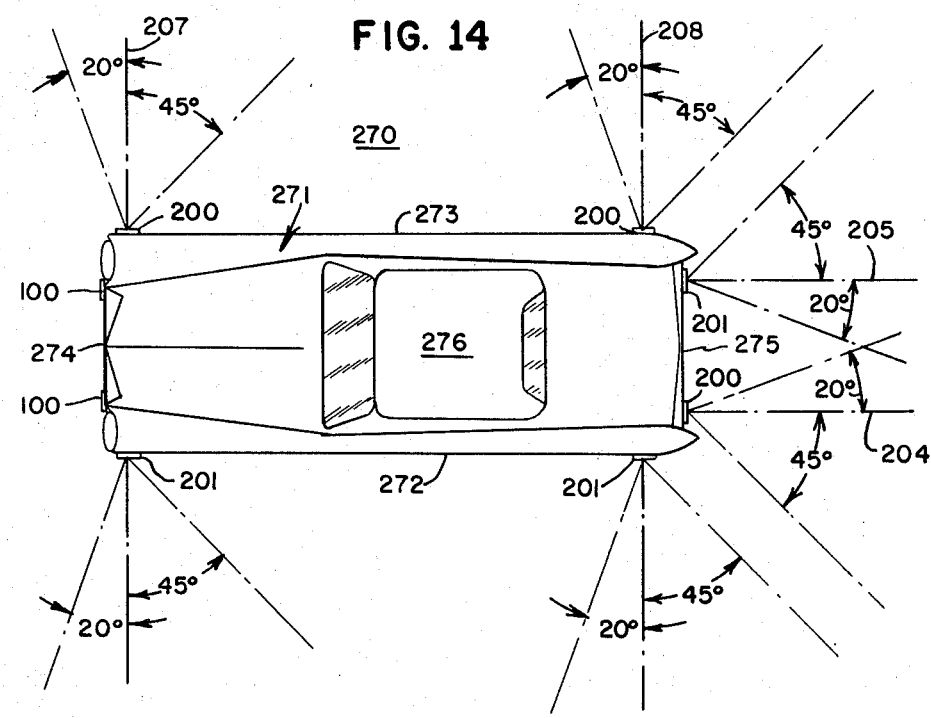

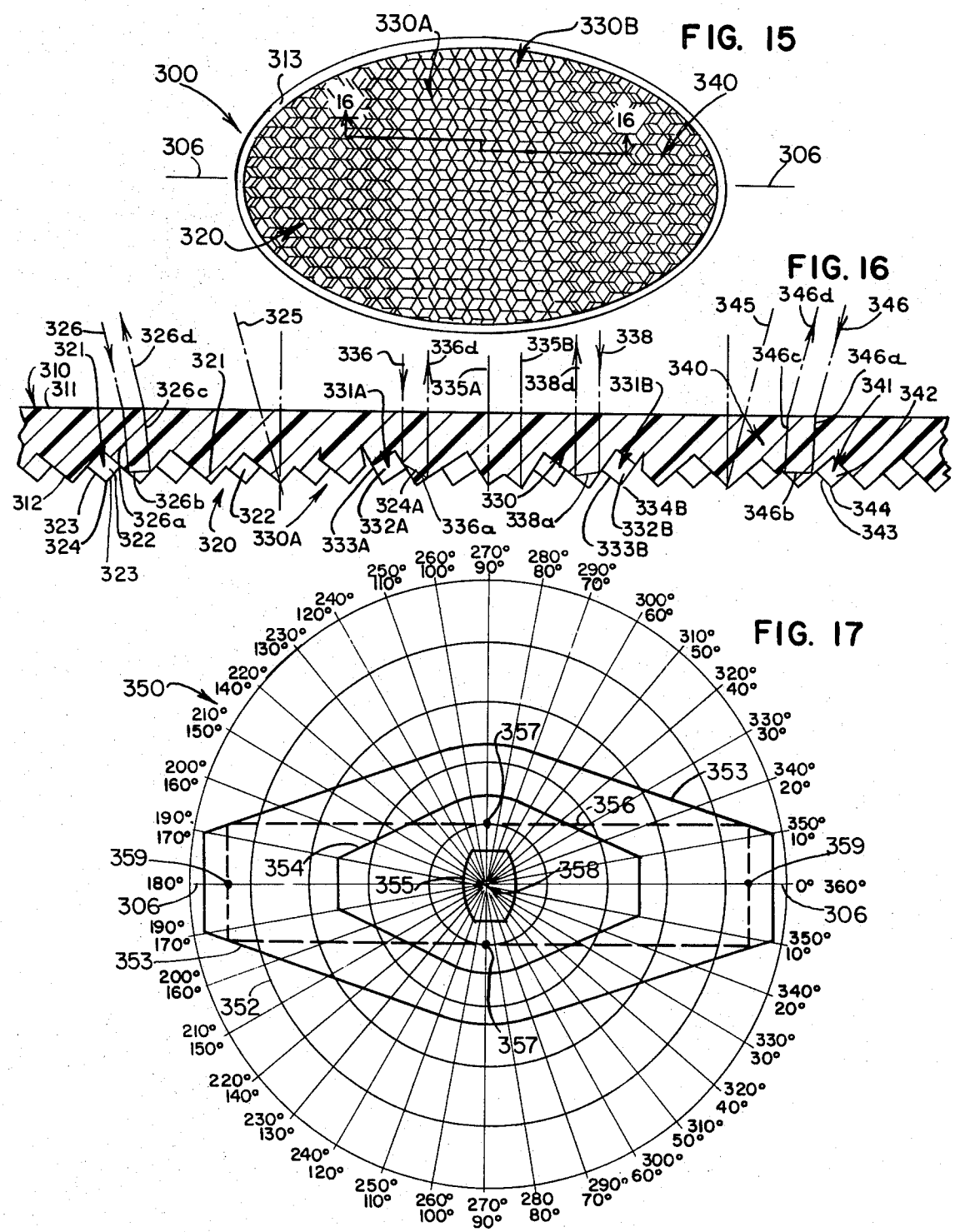

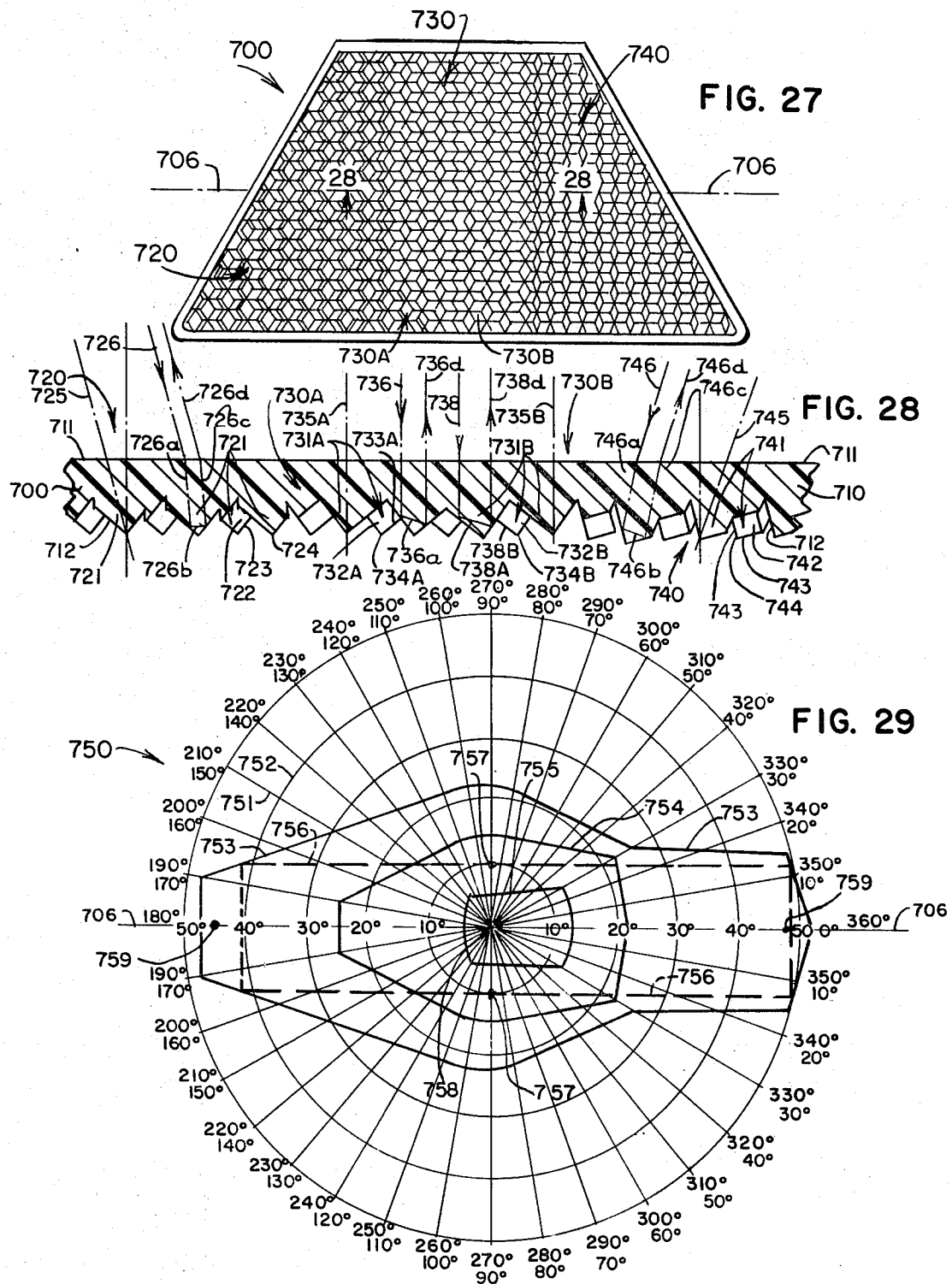

United States Patent Office 3,541,606
Patented Nov. 17, 1970

3,541,606
REFLECTORIZED VEHICLES AND REFLECTORS THEREFOR
Sidney A. Heenan, Park Ridge, and Robert I. Nagel, Skokie, Ill., assignors, by mesne assignments, to Amerace Esna Corporation, New York, N.Y., a corporation of Delaware
Filed Oct. 16, 1967, Ser. No. 675,446
Int. Cl. G02b 5/12
U.S. Cl. 350—103
17 Claims

ABSTRACT OF THE DISCLOSURE

A fully reflectorized vehicle, having a pair of forward side reflectors mounted respectively on the sides adjacent to the front thereof, a pair of rearward side reflectors mounted respectively on the sides adjacent to the rear thereof, and a pair of back reflectors mounted on the back and disposed respectively outwardly toward the sides, the reflectors providing a zone of reflectorization about the vehicle wherein at least about 1.5 equivalent candlepower of light is reflected per foot-candle of incident light directed thereon throughout the zone of reflectorization. The reflectors having a substantially flat front face and have a wide external incident angle in the range from about 60° up to 100° and having two or three different groups of reflector elements thereon with the optical axes thereof disposed at different angles. The reflectors on the back are colored red, the rearward side reflectors are colored red, the forward side reflectors are colored yellow and the front reflectors are colored yellow or crystal.

---

The present invention is directed to an improved reflectorized vehicle such as an automobile, and to improved reflectors for accomplishing the reflectorization thereof.

It is an important object of the invention to provide an improved reflectorized vehicle, such as an automobile, wherein a good reflected signal is received at night when a light such as that of the headlights of an approaching vehicle are shined thereon throughout a wide zone of reflectorization, the zone reflectorization in accordance with one form of the invention extending from a point on one side of the vehicle disposed 20° in front thereof completely about the one side of the vehicle and about the back thereof and about the other side of the vehicle to a point disposed 20° forwardly thereof, the zone of reflectorization in another form of the invention extending completely around the vehicle.

Another object of the invention is to provide an improved reflectorized vehicle of the type set forth comprising a body having a pair of longitudinally extending sides and a back extending between the sides, a pair of forward side reflectors mounted respectively on the sides adjacent to the front thereof, a pair of rearward side reflectors mounted respectively on the sides adjacent to the rear thereof, and a pair of back reflectors mounted on the back and disposed respectively outwardly toward the sides, the reflectors providing a zone of reflectorization about the vehicle wherein at least about 1.5 equivalent candlepower of light is reflected per foot-candle of incident light directed thereon throughout the zone of reflectorization, the zone of reflectorization extending laterally from a point on one side of the vehicle disposed about 20° forwardly of the plane passing through the forward side reflectors normal to the longitudinal axis of the vehicle and about the entire one side of the vehicle and the entire back of the vehicle and forwardly about the entire other side of the vehicle to a point on the other side of the vehicle disposed about 20° forwardly of the plane passing through the forward side reflectors normal to the longitudinal axis of the vehicle.

In connection with the foregoing object, another object of the invention is to provide an improved reflectorized vehicle wherein the reflectors are disposed from about 15 inches to about 60 inches above the roadway, the zone of reflectorization has a vertical extent of 10° up and down from a plane passing through the reflectors and the reflectors each have a wide external incident angle in the range from about 60° to about 100°.

Another object of the invention is to provide an improved reflectorized vehicle of the type set forth wherein the zone of reflectorization extends completely around the vehicle.

Still another object of the invention is to provide an improved reflectorized vehicle of the type set forth wherein the various reflectors thereon have different colors so that the attitude and position of the vehicle can be readily determined by the color of the light reflected therefrom.

Yet another object of the invention is to provide an improved reflector for reflecting therefrom throughout a wide external incident angle along a longitudinal reflecting axis light falling upon one face thereof to reflect the light back toward the source thereof to render the reflector highly visible at night, the reflector comprising a body of transparent material having a front face and a rear face, a first group of retrodirective reflector elements on the body in a first section of the rear face, a second group of retrodirective reflector elements on the body in a second portion of the rear face, the first group of reflector elements having the optical axes thereof disposed substantially parallel to each other and disposed at a first predetermined angle with respect to the front face, thereby to provide along the longitudinal reflecting axis a first zone of reflectorization wherein at least about 1.5 equivalent candlepower of light is reflected per foot-candle of incident light directed thereon, the second group of reflector elements having the optical axes thereof disposed substantially parallel to each other and disposed at a second predetermined angle with respect to the front face, thereby to provide along the longitudinal reflecting axis a second zone of reflectorization wherein at least about 1.5 equivalent candlepower of light is reflected per foot-candle of incident light directed thereon, the first and second zones of reflectorization at least partially overlapping to provide a combined zone of reflectorization having an angular extent along the longitudinal reflecting axis and substantially normal to the front face of at least about 60°, thereby to provide a wide external incident angle for the reflector along the longitudinal reflecting axis.

In connection with the foregoing object, it is an object of the invention to provide an improved reflector of the type set forth wherein the first group of reflector elements have the optical axes thereof disposed substantially normal to the front face, and the second group of reflector elements have the optical axes thereof disposed at an acute angle with respect to a normal to the front face in the range from about 8° to about 30°.

Another object of the invention is to provide a reflector of the type set forth wherein both groups of reflector elements have the axes thereof inclined at angles in the range from about 8° to about 30° with respect to a normal to the front face, the two groups of optical axes being inclined in opposite directions along the longitudinal reflecting axis.

Still another object of the invention is to provide an improved reflector of the type set forth wherein the front face of the reflector is substantially flat and the retrodirective reflector elements are cube corner reflector elements.

A further object of the invention is to provide an improved reflector of the type set forth wherein three separate groups of reflector elements are provided on the body of transparent material, each goup of reflector elements providing a separate zone of reflectorization overlapping adjacent zones of reflectorization thereby to give an angular extent along the longitudinal reflecting axis thereof of at least about 80°.

Further features of the invention pertain to the particular arrangement of the reflectors on the reflectorized vehicles and the particular arrangement of the reflector elements on the reflectors, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 1 is a plan view of a reflectorized vehicle made in accordance with a first preferred embodiment of the present invention, the vehicle being reflectorized entirely along both sides and the back thereof;

FIG. 2 is a side view of the vehicle of FIG. 1;

FIG. 3 is a rear view of the vehicle of FIG. 1;

FIG. 10 is a plan view of another vehicle reflectorized completely therearound, all in accordance with the present invention;

FIG. 11 is a side view of the vehicle of FIG. 10;

FIG. 12 is a front view of the vehicle of FIG. 10;

FIG. 13 is a rear view of the vehicle of FIG. 10;

FIG. 14 is a plan view of another reflectorized vehicle made in accordance with the present invention;

FIG. 15 is a plan view of a reflector made in accordance with the present invention;

FIG. 16 is an enlarged fragmentary view in vertical section through the reflector of FIG. 15 along the line 16—16 thereof;

FIG. 17 is a diagram illustrating the performance of the reflector of FIGS. 15 and 16;

FIG. 27 is a plan view of a further reflector made in accordance with the present invention;

FIG. 28 is an enlarged fragmentary view in vertical section through the reflector of FIG. 27 along the line 28—28 thereof; and FIG. 29 is a diagram illustrating the performance of the reflector of FIGS. 27 and 28.

Figure 4:
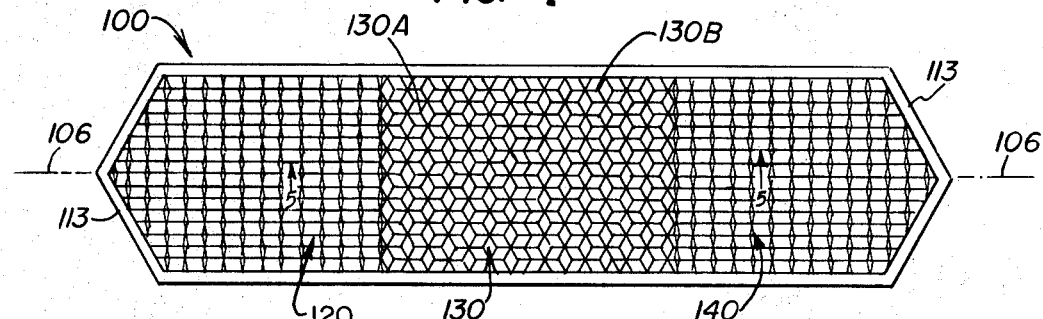
FIG. 4 is a view on an enlarged scale of one of the side reflectors on the vehicle of FIGS. 1 to 3.

There is illustrated in FIGS. 1 to 3 of the drawings a reflectorized vehicle made in accordance with and embodying the principles of the present invention, the vehicle illustrated being a passenger automobile 50 including a body 51 having a pair of longitudinally extending sides 52 and 53, a front 54, a back 55, and a top 56. The body 51 is supported by four wheels 60 that are adapted to be supported upon a roadway 61 over which the automobile 50 travels. Each of the sides 52 and 53 is provided with a pair of doors 62 and 63 hinged thereon; the front 54 has thereon a pair of headlights 64 and the usual bumper 65, and the back 55 has the usual bumper 66.

In order to provide a zone of reflectorization extending completely along the sides 52 and 53 and along the back 55, six reflectors have been mounted respectively upon the sides 52 and 53 and upon the back 55. More specifically, a pair of forward side reflectors 100 and 101 have been provided on the lefthand and righthand sides 52 and 53, respectively, and a pair of rearward side reflectors 102 and 103 have been provided on the sides 52 and 53, respectively. There further has been provided on the back 55 a pair of spaced apart reflectors 200 and 201 disposed on the left and right, respectively.

The forward side reflectors 100 and 101 are more specifically mounted adjacent to the front of the respective sides 52 and 53 and very near the front 54 and are disposed immediately above the adjacent portions of the front bumper 65, whereby to position the reflectors 100 and 101 approximately 20 inches above the roadway 61. In accordance with the present invention it is desirable that the reflectors 100 and 101 be disposed at points spaced above the roadway 61 in a range from about 15 inches to about 60 inches. The forward side reflectors 100 and 101 lie along a line 104 normal to the longitudinal axis of the automobile 50, and as illustrated in FIG. 1, each presents a zone of reflectorization extending 50° forwardly and 50° readwardly of a plane designated by the numeral 104 in FIG. 1 passing through the centers of the reflectors 100 and 101 and normal to the longitudinal axis of the automobile 50. Each of the forward side reflectors 100 and 101 more specifically reflects at least about 1.5 equivalent candlepowers of light per foot-candle of incident light directed thereon throughout a lateral zone extending laterally from a point disposed about 50° forwardly of the plane 104 and rearwardly to a point disposed about 50° rearwardly of the plane 104. Furthermore, each of the reflectors 100 and 101 provides a zone of reflectorization as described that has a vertical extent of at least 10° above and below a horizontal plane passing through the centers of the reflectors 100 and 101, all as will be described more fully hereinafter. In addition the reflectors 100 and 101 reflect at least about 3.0 equivalent candlepower of light per foot-candle of incident light directed thereon at points located 10° directly above and 10° directly below the reflectors, and also reflect at least about 4.5 equivalent candlepower of light per foot-candle of incident light directed thereon normal to the faces thereof.

The rearward side reflectors 102 and 103 are more specifically mounted adjacent to the rear of the respective sides 52 and 53 and very near the back 55 and are disposed in general horizontal alignment with the forward side reflectors 100 and 101, respectively, whereby to position the reflectors 102 and 103 approximately 20 inches above the roadway 61. In accordance with the present invention it is desirable that the reflectors 102 and 103 be disposed at points spaced above the roadway 61 in a range from about 15 inches to about 60 inches. The rearward side reflectors 102 and 103 lie along a line parallel to the longitudinal axis of the automobile 50 and as illustrated in FIG. 1 each presents a zone of reflectorization extending 50° forwardly and 50° rearwardly of a plane designated by the numeral 105 in FIG. 1 passing through the reflectors 102 and 103 and normal to the axis of the automobile 50. Each of the rearward side reflectors 102 and 103 more specifically reflects at least about 1.5 candlepowers of light per foot-candle of incident light directed thereon throughout a lateral zone extending laterally from a point disposed about 50° forwardly of the plane 105 and rearwardly to a point disposed about 50° rearwardly of the plane 105. Furthermore, each of the reflectors 102 and 103 provides a zone of reflectorization as described that has a vertical extent of at least 10° above and below a horizontal plane passing through the centers of the reflectors 102 and 103, all as will be described more fully hereinafter. In addition the reflectors 102 and 103 reflect at least about 3.0 equivalent candlepowers of light per foot-candle of incident light directed thereon at points located 10° directly above and 10° directly below the reflectors, and also reflect at least about 4.5 equivalent candlepower of light per foot-candle of incident light directed thereon normal to the faces thereof.

The back reflectors 200 and 201 are more specifically mounted adjacent to the outer sides of the back 55 and are disposed immediately above the adjacent portion of the rear bumper 66, whereby to position the reflectors 200 and 201 approximately 20 inches above the roadway 61. In accordance with the present invention it is desirable that the reflectors 200 and 201 be disposed at points spaced above the roadway 61 in a range from about 15 inches to about 60 inches. The back reflectors 200 and 201 lie along a line normal to the longitudinal axis of the automobile 50, and as illustrated in FIG. 1, each presents a zone of reflectorization extending 45° outwardly and 20° inwardly of a vertical plane passing through the reflectors and parallel to the longitudinal axis of the automobile 50, the two planes mentioned being designated by the numerals 204 and 205. Each of the back reflectors 200 and 201 more specifically reflects at least about 1.5 equivalent candlepowers of light per foot-candle of incident light directed thereon throughout the lateral zone extending laterally from a point disposed about 45° outwardly and to a point disposed about 20° inwardly of the planes 204 and 205, respectively. Furthermore, each of the reflectors 200 and 201 provides a zone of reflectorization as described that has a vertical extent of at least 10° above and below a horizontal plane passing through the reflectors 200 and 201, all as will be described more fully hereinafter. In addition the reflectors 200 and 201 reflect at least about 3.0 equivalent candlepowers of light per foot-candle of incident light directed thereon at points located 10° directly above and 10° directly below the reflectors, and also reflect at least about 4.5 equivalent candlepowers of light per foot-candle of incident light directed thereon normal to the faces thereof.

It will be seen from FIG. 1 that the six zones of reflectorization provided by the six reflectors 100, 101, 102, 103, 200 and 201 are arranged and overlap so as to provide a zone of reflectorization about the automobile 50 extending laterally from a point on the left side of the automobile 50, for example, disposed about 50° forwardly of the plane 104 and along the entire side 52 and along the entire back 55 and along the entire side 53 to a point on the righthand side of the automobile 50 disposed about 50° forwardly of the plane 104. It is more particularly pointed out that in the above described zone of reflectorization, at least about 1.5 equivalent candlepowers of light are reflected per foot-candle of incident light directed thereon throughout the zone, the vertical extent of the zone being 10° up and down with respect to a horizontal plane passing through the six reflectors. Such reflectorization of the automobile 50 provides increased visibility thereof at night to oncoming vehicles having headlights thereon, the operators of the oncoming vehicles being apprised of the presence of the vehicle 50 regardles of the angle at which the vehicle 50 is viewed by the operator of the oncoming vehicle throughout the entire zone of reflectorization described. As a result, operation of the automobile 50 is materially safer, and there is materially less chance and likelihood of collision thereof with an approaching vehicle.

In accordance with another important feature of the present invention, the several reflectors around the vehicle 50 have different colors. Preferably the back reflectors 200 and 201 are colored red; the rearward side reflectors 102 and 103 are also colored red; and the forward side reflectors 100 and 101 are colored yellow. By coloring the reflectors in this manner, the attitude and position of the vehicle 50 can be readily determined by the color of light reflected therefrom. More specifically, if the viewer can see only red reflected light, he knows that he is viewing the rear of the vehicle 50. On the other hand, if the viewer can see three red reflectors and one yellow reflector, he knows that he is viewing the vehicle 50 from one of the rear quarters thereof. Should the viewer see a single red reflector and a yellow reflector, he knows that he is viewing the vehicle 50 from the side thereof. By suitably coloring the various reflectors on the vehicle, an added safety feature is provided, namely, the attitude and position of the vehicle 50 can readily be determined by the color of light reflected from the various reflectors thereon.

There has been used hereinabove and will be used hereinafter the term "equivalent candlepower" which is defined as (a) the actual candlepower reflected when the reflector is colored red, and (b) when the reflector is colored other than red, the candlepowers of light reflected equivalent to that which would have been reflected if the reflector were colored red. In the case of a yellow reflector, the actual value of the reflected candlepower must be 2.5 times that which would have been reflected if the reflector had been colored red, whereby for a yellow reflector the term "1.5 equivalent candlepowers of light" corresponds to 3.75 actual candlepowers of reflected light. In the case of a crystal or white or uncolored reflector, the actual value of the reflected candlepower must be 4.0 times that which would have been reflected if the reflector had been colored red, whereby for a crystal reflector the term "1.5 equivalent candlepowers of light" corresponds to 6.0 actual candlepowers of reflected light. Hereinafter the term "equivalent candlepower" will therefore be utilized to mean the candlepower that would have been reflected if the reflector had been colored red, it being understood that these values can be readily converted to actual candlepowers for yellow reflectors by multiplying with the factor 2.5, and can be readily converted to actual candlepowers for crystal reflectors by multiplying with the factor 4.0, and can be readily converted to actual candlepowers for reflectors of other colors using like suitable factors.

In accordance with the present invention each of the reflectors 100, 101, 102 and 103 is identical in physical construction one to the other, although perhaps of different color, and furthermore, these reflectors are essentially flat in shape so that they do not detract from the esthetic appearance of the automobile 50, and in fact are incorporated as an integral part of the design thereof, it being understood that the thickness of the several reflectors is exaggerated in FIGS. 1 to 3 for illustrative purposes. The reflectors 200 and 201 are also substantially flat and thin reflectors which do not detract from the esthetic appearance of the automobile 50 and in fact can be incorporated into the fundamental design thereof.

Figure 5:
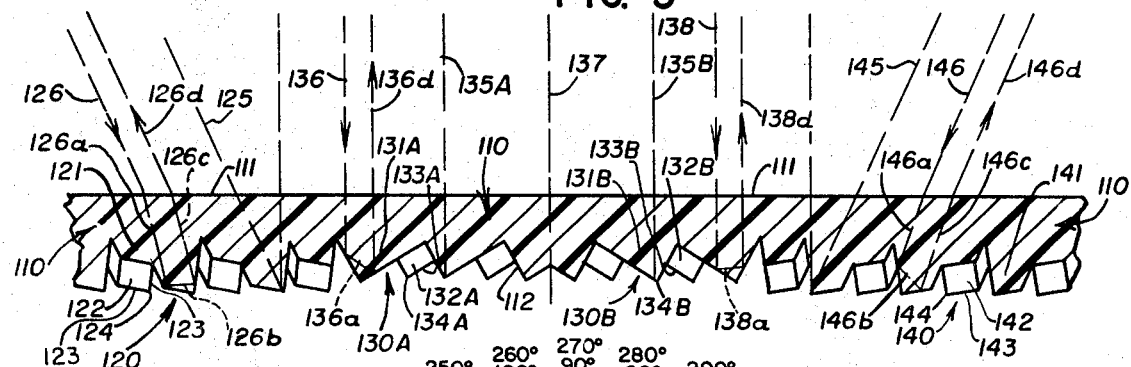
FIG. 5 is a further enlarged fragmentary view in vertical section through the reflector of FIG. 4 along the line 5—5 thereof.
Figure 6:
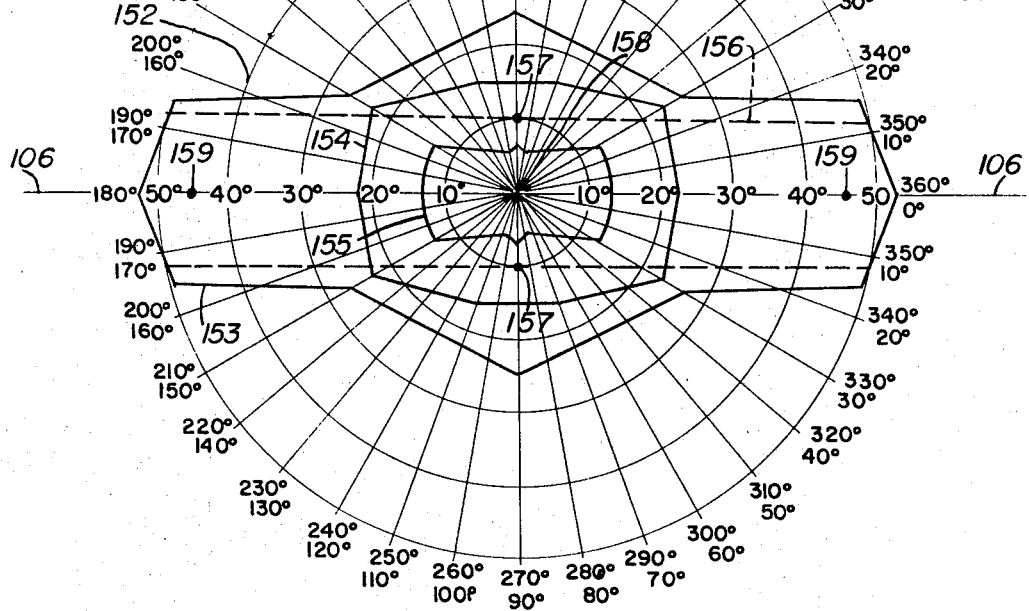
FIG. 6 is a diagram illustrating the performance of the reflector of FIGS. 4 and 5.

There is illustrated in FIGS. 4 and 5 of the drawings the construction of the reflector 100, it being understood that the reflectors 101, 102 and 103 are identical thereto, except as to color, and FIG. 6 of the drawings is a representation of a chart illustrating the performance of the reflector 100 when light from an oncoming vehicle is shined thereon. Referring to FIGS. 4 and 5, it will be seen that the reflector 100 includes a body 110 of transparent material formed of a synthetic organic plastic resin, the preferred resin being a methyl methacrylate resin, a body of the resin being molded to provide a substantially flat front face 111, a configurated rear face 112 and a border or rim 113 extending completely therearound.

The reflector 100 is more specifically divided into three sections 120, 130 and 140. The first reflector section 120 is disposed to the left in FIGS. 4 and 5 and is generally rectangular in shape but has a pointed lefthand end as seen in FIG. 4. The entire area of the first reflector section 120 is filled on the rear face 112 with a first group of retrodirective cube corner reflector elements 121, the cube corner reflector elements 121 each having three mutually perpendicular reflecting rear surfaces 122 intersecting along lines or edges 123 and terminating at a rear vertex 124. Each of the reflector elements 121 has a cube axis represented by a dashed line 125, the cube axes 125 being disposed at an angle of approximately 25° with respect to a line normal to the front face 111 of the reflector 100; the cube axes 125 are inclined in a manner such that an edge 123 is more nearly parallel to the front face 111, i.e., the reflector elements 121 are positioned about their own cube axes 125 so that one of the edges 123 is more nearly parallel to the front face 111 than is any of the reflecting surfaces 122; in other words, the cube to cube axis plane is oriented at 0°. More particularly, all of the cube axes 125 are disposed in planes normal to the front face 111 and parallel to the longitudinal reflecting axes 106 of the reflector 100. The cube axes 125 are inclined in the same direction and are parallel to the longitudinal reflecting axis 106, i.e., inclined to the left as viewed in FIG. 5 and at the same angle of approximately 25° with respect to a plane normal to the front face 111 and also passing through the vertex 124 of the associated cube corner reflector element 121. It is to be understood that the term "longitudinal reflecting axis" is not necessarily indicative of the geometry of the reflector 100, but rather designates a line or axis along which the reflector 100 has a wide angular response to incident light. The reflector section 120 is particularly designed to receive an entering ray 126 from the left that strikes the front face 111 at an angle in the range 20° to 50° with respect to a plane normal to the front face 111, the entering ray 126 being refracted as at 126a after which it is reflected from one of the surfaces 122 along the line 126b and then is again reflected from a second one of the faces 122 and is again reflected from a third one of the faces 122 along the line 126c and exits as a reflected ray 126d, the reflected ray 126d being directed back toward the source of illumination in a direction parallel to the entering ray 126.

The second reflector section 130 is disposed in the center in FIGS. 4 and 5 and is generally rectangular in shape, the reflector section 130 comprising two reflector sub-sections 130A and 130B. The entire area of the second reflector section 130 is filled on the rear face 112 with two sub-groups of retrodirective cube corner reflector elements 131A and 131B, the cube corner reflector elements 131A each having three mutually perpendicular reflecting rear surfaces 132A intersecting along lines or edges 133A and terminating at a rear vertex 134A; similarly, the cube corner reflector elements 131B each have three mutually perpendicular reflecting rear surfaces 132B interesecting along lines or edges 133B and terminating at a rear vertex 134B. Each of the reflector elements 131A has a cube axis represented by the dashed line 135A, the cube axes 135A being disposed normal to the front face 111 of the reflector 100; each of the reflector elements 131B has a cube axis represented by a dashed line 135B, the cube axes 135B being disposed normal to the front face 111 of the reflector 100. The difference between the reflector sub-sections 130A and 130B lies in the orientation of the cube corner reflector elements about the cube axes thereof, an edge in each case lying in a plane normal to the front face 111 and parallel to the longitudinal reflecting axis 106. The edge of each reflector element in one sub-section 130A is inclined in one direction and an edge of each reflector element in the other sub-section 130B is inclined in the other direction along the axis 106, thereby to provide a so-called "split center" normal or standard reflector of the cube corner type. The reflector section 130 is particularly designed to receive entering rays 136 and 138 that strike the front face 111 at angles 20° on either side of the normal thereto. For example, the entering ray 136 in the reflector sub-section 130A is not refracted upon entering the body 110 but is reflected from the associated reflecting surfaces 132A along the line 136a and exits as a reflected ray 136d, the reflected ray 136d being directed back toward the source of illumination in a direction parallel to the entering ray 136. The entering ray 138 normal to the front face 111 in the sub-section 130B also enters the body 110 without refraction and is reflected from the faces 132B along the line 138a and exits as a reflected ray 138d, the reflected ray 138d being directed back toward the source of illumination in a direction parallel to the entering ray 138.

The third reflector section 140 is disposed to the right in FIGS. 4 and 5 and is generally rectangular in shape but has a pointed righthand end as seen in FIG. 4. The entire area of the third reflector section 140 is filled on the rear face 112 with a third group of retrodirective cube corner reflector elements 141, having the same construction as the reflector elements 121 except that the cube axes 145 are inclined to the right as viewed in FIGS. 4 and 5 at an angle of approximately 25° with respect to a normal to the front face 111. Parts of the reflector elements 141 corresponding to parts of the elements 121 are labelled with corresponding reference numerals with a factor of 20 added thereto.

The first reflector section 120 in effect provides a first zone of reflectorization inclined to the left as viewed in FIG. 5 approximately 39° with respect to a normal to the front face 111 of the reflector 100, the second reflector section 130 provides a second zone of reflectorization directed normal to the front face 111 of the reflector 100, and the third reflector section 140 in effect provides a third zone of reflectorization inclined to the right as viewed in FIG. 5 approximately 39° with respect to a normal to the front face 111 of the reflector 100, all directions being with respect to the longitudinal reflecting axis 106 of the reflector 100. The several zones of reflectorization are further arranged so that the first and second zones of reflectorization overlap and the second and third zones of reflectorization overlap, thereby giving a continuous zone of reflectorization along the axis 106 through an included angle of approximately 100° and in a vertical direction 10° above and below a plane normal to the front face 111 and including the reflecting axis 106.

The response of the reflector 100 to light incident thereon is plotted in the diagram of FIG. 6 which is a series of iso-candlepower per foot-candle curves plotted on polar coordinates, all of the values being for a reflector 100 colored red. The diagram is generally designated by the numeral 150 and includes a plurality of radial lines 151 disposed 10° apart and a plurality of concentric circles 152 that represent a 10° increment of the angle of incident light with respect to a normal to the reflector front face 111.

The outermost curve designated 153 encloses the area of the diagram 150 wherein at least about 1.5 equivalent candlepowers of light are reflected by the reflector 100 per foot-candle of incident light directed thereon. The area bounded by the curve 153 extends more than 50° on either sode of the center of the reflector 100 in a horizontal direction and extends more than 20° up and down toward the center of the reflector 100 and more than 10° up and down toward the outer ends of the reflector 100. A dashed rectangle 156 indicates the zone of reflectorization which is 50° on either side of the vertical centerline of the reflector 100 and 10° up and down from the horizontal axis 106 wherein light directed on the reflector 100 will provide 1.5 equivalent candlepowers of reflected light per foot-candle of incident light directed thereon.

The curve 154 indicates the area or zone of reflectorization wherein 3.0 equivalent candlepowers of light are reflected per foot-candle of incident light directed thereon. The zone confined within the curve 154 has a horizontal extent of slightly more than 20° on either side of the vertical centerline of the reflector 100 and extends vertically approximately 15° above and below the longitudinal reflecting axis 106.

The curve 155 encloses the area or defines the zone of reflectorization wherein 4.5 equivalent candlepowers of light are reflected per foot-candle of incident light directed thereon, this zone of reflectorization being confined centrally of the reflector 100. There further are indicated on the chart 150 points 157 that are disposed respectively 10° above and 10° below the longitudinal reflecting axis 106, points at which under certain specifications at least 3.0 equivalent candlepowers of light must be reflected per foot-candle of incident light directed thereon. Point 158 identifies the point at which certain specifications require that at least 4.5 equivalent candlepowers of light be reflected per foot-candle of incident light directed thereon. Finally, the points 159 lying to the left and right on the axis 106 are disposed at 45° points at which at least 1.5 equivalent candlepowers of light are reflected per foot-candle of incident light directed thereon.

From the above it will be noted that the reflector 100 satisfies all of the requirements for a red Class A retrodirective or reflex reflector prescribed by the Society of Automotive Engineers, namely, those set forth in SAE Standard J594c. In addition, the reflector 100 is effective through a much wider entrance angle, namely, approximately 50° left and right of the centerline, in which entrance angle the reflector 100 provides 1.5 equivalent candlepowers of reflected light per foot-candle of incident light thereon.

As explained above, the diagram of FIG. 6, and particularly the numerical values given therein, are for a reflector that is colored red, whereby the values given therein are "equivalent candlepowers" as that term is used herein. To determine the actual candlepower values for a yellow colored reflector 100, the various equivalent candlepower values in FIG. 6 should be multiplied by the factor 2.5; and to determine the actual candlepower values for a crystal or uncolored reflector 100, the various equivalent candlepower values in FIG. 6 should be multiplied by the factor 4.0; and to determine the actual candlepower values for a reflector 100 having other colors, the various equivalent candlepower values in FIG. 6 should be multiplied by like suitable factors.

Turning now to the back reflectors 200 and 201, these reflectors are formed substantially identical one to the other with the exception of the geometry thereof, the optical properties of the reflectors being identical. For purposes of illustration the reflector 201 has been illustrated in detail in FIGS. 7 and 8. The reflector 201 is essentially flat in shape so that it does not detract from the esthetic appearance of the automobile 50, and in fact is incorporated as an integral part of the design thereof, it being understood that the thickness each of the reflectors 200 and 201 has been exaggerated in the drawings.

Figure 7:
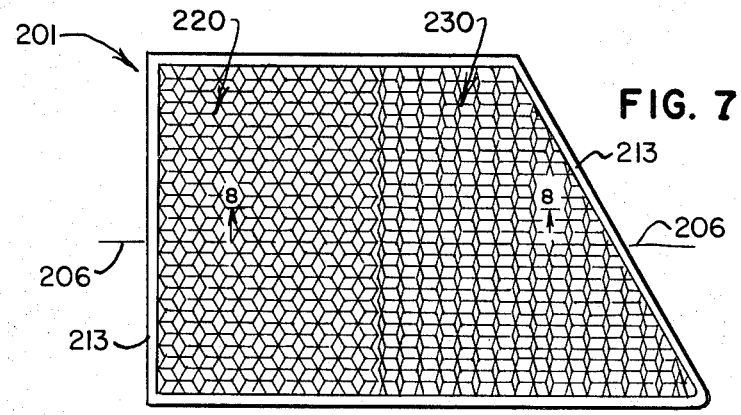
FIG. 7 is an enlarged plan view of one of the back reflectors on the vehicle of FIGS. 1 to 3.
Figure 8:
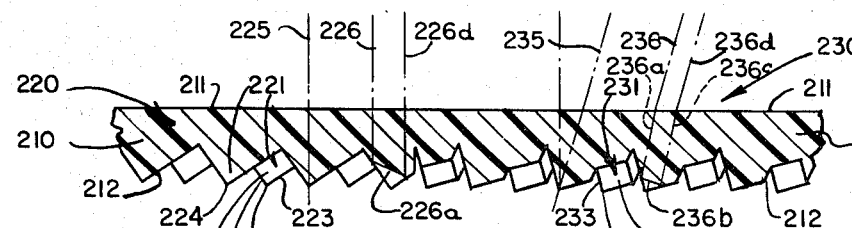
FIG. 8 is a further enlarged fragmentary view in vertical section through the reflector of FIG. 7 along the line 8—8 thereof.

Referring to FIGS. 7 and 8, it will be seen that the reflector 201 includes a body 210 of transparent material formed of a synthetic organic plastic resin, the preferred resin being a methyl methacrylate resin, a body of the resin being molded to provide a substantially flat front face 211, a configurated rear face 212 and a border or trim 213 extending completely therearound.

The reflector 201 is divided into two sections, a lefthand section 220 and a righthand section 230. The lefthand reflector section 220 is generally rectangular in shape, the entire area of the reflector section 220 being filled on the rear face 212 with retrodirective cube corner reflector elements 221. The cube corner reflector elements 221 each have three mutually perpendicular reflecting rear surfaces 222 intersecting along lines or edges 223 and terminating at a rear vertex 224. Each of the reflector elements 221 has a cube axis represented by the dashed line 225, the cube axes 225 being disposed normal to the front face 211 of the reflector 201, the orientation of each cube corner reflector 221 about its own cube axis 225 being such that, an edge 223 of each of the reflector elements 221 is directed from the vertex 224 to the right as viewed in FIG. 7 and lies in a plane parallel to the longitudinal reflecting axis 206.

The reflector section 220 is particularly designed to receive entering rays 226 that strike the front face 211 at an angle within 20° on either side of the normal thereto. For example, the entering ray 226 striking the reflector section 220 is not refracted upon entering the body 210 but is reflected from the associated reflecting surfaces 222 as at 226a and exits as a reflected ray 226d, the reflected ray 226d being directed back toward the source of illumination in a direction parallel to the entering ray 226.

The second reflector section 230 is disposed to the right in FIGS. 7 and 8 and in plan view is shaped as a trapezoid. The entire area of the second reflector section 230 is filled on the rear face 212 with a second group of retrodirective cube corner reflector elements 231, the cube corner reflector elements 231 each having the same construction as the elements 121 in the reflector 100 except that the cube axes 235 are inclined to the right as viewed in FIGS. 7 and 8 at an angle of approximately 20° with respect to a normal to the front face 211. In the interest of brevity further description of the reflector elements 231 will be omitted, it being understood that parts of the reflector elements 231 corresponding to the elements 121 being labelled with corresponding reference numerals having a factor of 110 added thereto.

The first reflector section 220 in effect provides a first zone of reflectorization directed normal to the front face 211 of the reflector 201, and the second reflector section 230 in effect provides a second zone of reflectorization inclined to the right as viewed in FIG. 8 approximately 31° with respect to a normal to the front face 211 of the reflector 201, all directions being with respect to the longitudinal reflecting axis 206 of the reflector 201. The two zones of reflectorization are further arranged so that they overlap, thereby to give a continuous zone of reflectorization along the axis 206 through an included angle of approximately 65° and in a vertical direction 10° above and below a plane normal to the front face 211 and including the reflecting axis 206.

Figure 9:
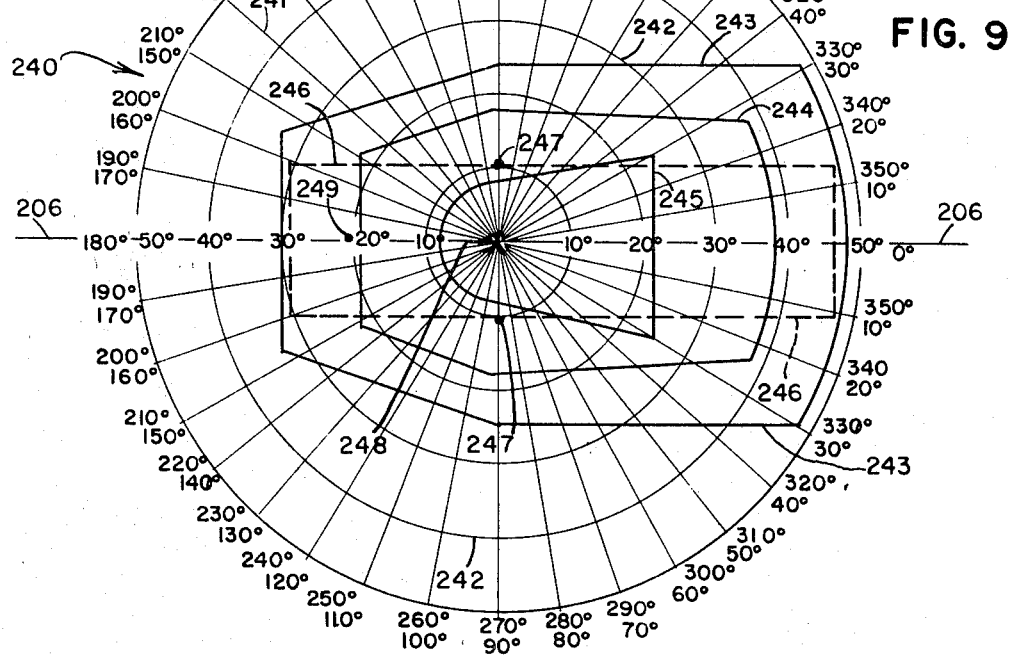
FIG. 9 is a diagram illustrating the performance of the reflector of FIGS. 7 and 8.

The response of the reflector 201 to light incident thereon is plotted in the diagram of FIG. 9 which is a series of iso-candlepower per foot-candle curves plotted on polar coordinates, all of the values being for a reflector 201 colored red. The diagram is generally designated by the numeral 240 and includes a plurality of radial lines 241 disposed 10° apart and a plurality of concentric circles 242 that represent a 10° increment of the angle of incident light with respect to a normal to the reflector front face 211.

The outermost curve 243 encloses the area of the diagram 240 wherein at least about 1.5 equivalent candlepowers of light are reflected by the reflector 201 per foot-candle of incident light directed thereon. The area bounded by the curve 243 extends approximately 30° to the left of the center of the reflector 201 in a horizontal direction and extends slightly less than 50° to the right of the center of the reflector 201 in a horizontal direction, and extends more than 20° up and down toward the righthand end of the reflector 201 and more than 15° up and down toward the lefthand end of the reflector 201. A dashed rectangle 246 indicates the zone of reflectorization which is 45° to the right and more than 20° to the left of the vertical centerline of the reflector 201 and 10° up and down from the horizontal axis 206 wherein light directed on the reflector 201 will provide 1.5 equivalent candlepowers of reflected light per foot-candle of incident light directed thereon.

The curve 244 indicates the area or zone of reflectorization wherein 3.0 equivalent candlepowers of light are reflected per foot-candle of incident light directed thereon. The zone confined within the curve 244 has a horizontal extent of slightly less than 40° to the right and slightly less than 20° to the left and extends vertically slightly less than 20° above and below the longitudinal reflecting axis 206.

The curve 245 encloses the area or defines the zone of reflectorization wherein 4.5 equivalent candlepowers of light are reflected per foot-candle of incident light directed thereon, this zone of reflectorization being confined generally centrally of the reflector 201 and extending a short distance to the right. There further are indicated on the chart 240 points 247 that are disposed respectively 10° above and 10° below the longitudinal reflecting axis 206, points at which under the SAE specification for red Class A reflex reflectors, SAE Standard J594c, at least 3.0 equivalent candlepowers of light must be reflected per foot-candle of incident light directed thereon. Point 248 identifies the point at which the above noted SAE specification requires that at least 4.5 equivalent candlepowers of light be reflected per foot-candle of incident light directed thereon. Finally, the points 249 lying to the left and right on the axis 206 are disposed at points at which at least 1.5 equivalent candlepowers of light are reflected per foot-candle of incident light directed thereon.

As explained above, the diagram of FIG. 9, and particularly the numerical values given therein, are for a reflector that is colored red, whereby the values given therein are "equivalent candlepowers" as that term is used herein. To determine the actual candlepower values for a yellow colored reflector 201, the various equivalent candlepower values in FIG. 9 should be multiplied by the factor 2.5; and to determine the actual candlepower values for a crystal or uncolored reflector 201, the various equivalent candlepower values in FIG. 9 should be multiplied by the factor 4.0; and to determine the actual candlepower values for a reflector 201 having other colors, the various equivalent candlepower values given in FIG. 9 should be multiplied by like suitable factors.

It will be understood that the reflector 200 is identical to the reflector 201 but as the mirror image thereof so that the zone of reflectorization extends 45° to the left of the centerline as illustrated in FIG. 1.

There is illustrated in FIGS. 10 to 13 of the drawings a second preferred arrangement of reflectors on an automobile 250 to provide good reflectorization thereof in accordance with the present invention. The vehicle 250 is a passenger automobile including a body 251 having a pair of longitudinally extending sides 252 and 253, a front 254, a back 255 and a top 256. The body 251 is supported by four wheels 260 that are adapted to be disposed upon a roadway 261 over which the automobile 250 travels. Each of the sides 252 and 253 is provided with a pair of doors 262 and 263 hinged thereon; the front 254 has thereon a pair of head lights 264 and the usual bumper 265, and the back 255 has thereon the usual bumper 266.

In the automobile 250 of FIGS 10 to 13, a zone of reflectorization is provided extending completely therearound, i.e., there is reflectorization provided along both sides 252 and 253, the front 254 and the back 255, eight reflectors having been provided for this purpose. More specifically, a pair of forward side reflectors 100 and 101 have been provided on the lefthand and righthand sides 252 and 253, respectively, and a pair of rearward side reflectors 102 and 103 have been provided on the sides 252 and 253, respectively. There further has been provided on the back 255 a pair of spaced apart back reflectors 100 disposed on the right and left, respectively, and there further has been provided on the front 254 a pair of spaced apart front reflectors 100 disposed on the left and right, respectively.

The reflectors 100, 101, 102 and 103 are mounted on the automobile 250 in the same manner and location respectively as are the corresponding reflectors mounted on the automobile 50 shown in FIG. 1. Each of the reflectors 100, 101, 102 and 103 is constructed in the same manner as the reflector 100 shown in FIGS. 4 and 5 and therefore has the same zone of reflectorization and reflects the same quantity of light for a given quantity of incident light. The two back reflectors 100 are mounted on the automobile 250 in the same manner and location as are the reflectors 200 and 201 on the automobile 50. Each of the back reflectors 100 has the same construction as the reflector 100 shown in FIGS. 4 and 5 and therefore has the same zone of reflectorization and reflects the same intensity of light for a given intensity of incident light.

The front reflectors 100 are more specifically mounted adjacent to the outer sides of the front 254 and are disposed immediately above the adjacent portions of the front bumper 265, whereby to position the front reflectors 100 approximately 20 inches above the roadway 261. The front reflectors 100 lie along a line normal to the longitudinal axis of the automobile 250. Each of the front reflectors 100 has the same construction as the reflector 100 shown in FIGS. 4 and 5 and therefore has the same zone of reflectorization and reflects the same quantity of light for a given quantity of incident light.

It will be seen from FIG. 10 that the eight zones of reflectorization provided by the eight reflectors 100, 101, 102 and 103 are arranged and overlapped so as to provide a zone of reflectorization extending completely about and around the automobile 250. It is more particularly pointed out that in the above described zone of reflectorization, at least about 1.5 equivalent candlepowers of light are reflected per foot-candle of incident light directed thereon throughout the zone, the vertical extent of the zone being 10° up and down with respect to a horizontal plane passing through the eight reflectors. Such reflectorization of the automobile 250 provides increased visibility thereof at night to oncoming vehicles having headlights thereon, the operators of the oncoming vehicles being apprised of the presence of the vehicle 250 regardless of the angle at which the vehicle 250 is viewed by the operator of the oncoming vehicle throughout the entire zone of reflectorization described. As a result, operation of the automobile 250 is materially safer, and there is materially less chance and likelihood of collision thereof with an approaching vehicle.

It will be understood that each of the reflectors 100, 101 and 103 is identical one to the other, except as to color, and more specifically is identical to the reflector 100 described above in detail with respect to FIGS. 4 to 6 herein.

In accordance with another important feature of the present invention, the several reflectors around the vehicle 250 have different colors. Preferably the back reflectors 100 are colored red; the rearward side reflectors 102 and 103 are also colored red; the forward side reflectors 100 and 101 are colored yellow, and the front reflectors 100 are colorless or crystal, although the front reflectors 100 may also be yellow. The attitude and position of the vehicle 250 can be readily determined by the color of light reflected therefrom. More specifically, if the viewer can see only red reflected light, he knows that he is viewing the rear of the vehicle 250. On the other hand, if the viewer can see three red reflectors and one yellow reflector, he knows that he is viewing the vehicle 250 from one of the rear quarters thereof. Should the viewer see a red reflector and a yellow reflector, he knows that he is viewing the vehicle 250 from a side thereof. If the viewer sees a red reflector and a yellow reflector and a crystal reflector (or two yellow reflectors when the front reflectors 100 are yellow rather than crystal), he knows that he is viewing the vehicle 250 from the front quarter. Finally, if the viewer sees only white or crystal reflected light (or only yellow reflected light in the case wherein the front reflectors 100 are colored yellow), he knows he is viewing the vehicle 250 from the front thereof. By suitably coloring the various reflectors on the vehicle, an added safety feature is provided, namely, the attitude and position if the vehicle 250 can readily be determined by the colors of light reflected from the various reflectors thereon.

There is illustrated in FIG. 14 of the drawings, a third preferred form of reflectorized vehicle made in accordance with and embodying the principles of the present invention, FIG. 14 being like FIGS. 1 and 10 described above. There is shown in FIG. 14 a passenger automobile 270 including a body 271 having a pair of longitudinally extending sides 272 and 273, a front 274, a back 275 and a top 276, the front 274 having thereon a pair of headlights 284.

In order to provide a zone of reflectorization extending completely along the sides 272 and 273 and along the back 275, six reflectors have been mounted upon the sides 272 and 273 and upon the back 275. More specifically, a pair of forward side reflectors 200 and 201 have been provided on the right hand and left hand sides 273 and 272, respectively, and a pair of rearward side reflectors 200 and 201 have been provided on the sides 273 and 272, respectively. There has been provided on the back 275 a pair of spaced apart reflectors 200 and 201 disposed on the left and right, respectively. The forward side reflectors 200 and 201, the rearward side reflectors 200 and 201 and the back reflectors 200 and 201 are mounted on the automobile 270 in the same manner and location respectively as are the forward side reflectors 101 and 100, the rearward side reflectors 103 and 102 and the back reflectors 200 and 201 mounted on the automobile 50. Each of the reflectors 200 and 201 in FIG. 14 is constructed like the reflector shown in FIGS. 7 and 8, and therefore has the same zone of reflectorization and reflects the same intensity of light for a given intensity of incident light.

Vehicle 270 has the same colors as the corresponding reflectors on the vehicle 50 of FIG. 1, thereby to achieve the same advantages. Preferably the back reflectors 200 and 201 are colored red; the rearward side reflectors 200 and 201 are also colored red; and the forward side reflectors 200 and 201 are colored yellow.

Although in FIG. 14, there has been shown for illustrative purposes a small gap between the zones of reflectorization of a rearward side reflector 200 or 201 and the adjacent back reflector 200 and 201, it will be understood that as a practical matter the gap is essentially zero and as is illustrated in FIG. 9, the zone of reflectorization of the reflectors 200 and 201 is actually slightly greater than 45°, thereby to insure overlapping the zones of reflectorization at the rear of the automobile 270.

There is illustrated in FIGS. 15 and 16 of the drawings the construction of another reflector 300 made in accordance with and embodying the principles of the present invention, the reflector 300 being generally useful in all those places wherein the reflector 100 described above is useful; and FIG. 17 of the drawings is a representation of a chart ilustrating the performance of the reflector 300 when light from an oncoming vehicle is shined thereon. Referring to FIGS. 15 and 16, it will be seen that the reflector 300 includes a body 310 of transparent material formed of a synthetic organic plastic resin, the preferred resin being a methyn methacrylate resin, a body of the resin being molded to provide a substantially flat front face 311, a configurated rear face 312 and a border or rim 313 extending completely therearound.

The reflector 300 is more specifically divided into three reflector sections 320, 330 and 340. The first reflector section 320 is disposed to the left in FIGS. 15 and 16 and is shaped like the end of an ellipse. The entire area of the first reflector section 320 is filled on the rear face 312 with a first group of retrodirective cube corner reflector elements 321, the cube corner reflector elements 321 each having three mutually perpendicular reflecting rear surfaces 322 intersecting along lines or edges 323 and terminating at a rear vertex 324. Each of the reflector elements 321 has a cube axis represented by a dashed line 325, the cube axes 325 being disposed at an angle of approximately 15° with respect to a line normal to the front face 311 of the reflector 300; the cube axes 325 are inclined in a manner such that a reflecting surface or face 322 is more nearly parallel to the front face 311, i.e., the reflector elements 321 are positioned about their own axes 325 so that one of the faces 322 is more nearly parallel to the front face 311 than is any of the edges 323; in other words, the cube to cube axis plane is oriented at 180°. More particularly, all of the cube axes 325 are disposed in planes normal to the front face 311 and parallel to the longitudinal reflecting axis of the reflector 300. The cube axes 325 are inclined in the same direction and are parallel to the longitudinal reflecting axis 306, i.e., inclined to the left as viewed in FIG. 16 and at the same angle of approximately 15° with respect to a plane normal to the front face 311 and also passing through the vertex 324 of the associated cube corner reflector element 321. The reflector section 320 is particularly designed to receive an entering ray 326 from the left that strikes the front face 311 at an angle of about 15° to about 45° with respect to a plane normal to the front face 311, the entering ray 326 being refracted as at 326a after which it is reflected from one of the surfaces 322 along the line 326b and then is again reflected from a second one of the faces 322 and is again reflected from a third one of the faces 322 along the line 126c and exits as a reflected ray 326d, the reflected ray 326d being directed back toward the source of illumination in a direction parallel to the entering ray 326.

The reflector section 330 is disposed in the center in FIGS. 15 and 16, the reflector section 330 comprising two reflector sub-sections 330A and 330B. The section 330 has the same construction as the reflector section 130 in the reflector 100 shown in FIGS. 4 and 5. In the interest of brevity, further description of the reflector section 330 will be omitted, it being understood that parts thereof corresponding to the reflector section 130 are labelled with corresponding reference numerals with the factor of 200 added thereto.

The third reflector section 340 is disposed to the right in FIGS. 15 and 16, the entire area of the third reflector section 340 being filled on the rear face 312 with a group of retrodirective cube corner reflector elements 341. The cube corner reflector elements 341 have the same construction as the reflector elements 321 except that the cube axes 345 are inclined to the right as viewed in FIGS. 15 and 16 at an angle of approximately 15° with respect to a normal to the front face 311. Parts of the reflector elements 341 corresponding to parts of the elements 321 are labelled with corresponding reference numerals with a factor of 20 added thereto.

The first reflector section 320 in effect provides a first zone of reflectorization inclined to the left as viewed in FIG. 16 approximately 23° with respect to a normal to the front face 311 of the reflector 300, the second reflector section 330 provides a second zone of reflectorization directed normal to the front face 311 of the reflector 300, and the third reflector section 340 in effect provides a third zone of reflectorization inclined to the right as viewed in FIG. 16 approximately 23° with respect to a normal to the front face 311 of the reflector 300, all directions being with respect to the longitudinal reflecting axis 306 of the reflector 300. The several zones of reflectorization are further arranged so that the first and second zones of reflectorization overlap and the second and third zones of reflectorization overlap, thereby to give a continuous zone of reflectorization along the axis 306 through an included angle of approximately 90° and in a vertical direction 10° above and below a plane normal to the front face 311 and including the reflecting axis 306.

The response of the reflector 300 to light incident thereon is plotted in the diagram of FIG. 17 which is a series of iso-candle power per foot-candle curves plotted on polar coordinates, all of the values being for a reflector colored red. The diagram is generally designated by the numeral 350 and includes a plurality of radial lines 351 disposed 10° apart and a plurality of concentric circles 352 that represent a 10° increment of the angle of incident light with respect to a normal to the reflector front face 311.

The outermost curve designated 353 encloses the area of the diagram 350 wherein at least about 1.5 equivalent candlepowers of light are reflected by the reflector 300 per foot-candle of incident light directed thereon. The area bounded by the curve 353 extends approximately 45° on either side of the center of the reflector 300 on a horizontal direction and extends more than 20° up and down toward the center of the reflector 300 and more than 10° up and down toward the outer ends of the reflector 300. A dashed rectangle 356 indicates the zone of reflectorization which is 45° on either side of the vertical centerline of the reflector 300 and 10° up and down from the horizontal axis 306 wherein light directed on the reflector 300 will provide 1.5 equivalent candlepowers or reflected light per foot-candle of incident light directed thereon.

The curve 354 indicates the area or zone of reflectorization wherein 3.0 equivalent candlepowers of light are reflected per foot-candle of incident light directed thereon. The zone confined within the curve 354 has a horizontal extent of slightly more than 25° on either side of the vertical centerline of the reflector 300 and extends vertically approximately 15° above and below the longitudinal reflecting axis 306 in the center of the reflector 300. The curve 355 encloses the area or defines the zone of reflectorization wherein 4.5 equivalent candlepowers of light are reflected per foot-candle of incident light directed thereon, this zone of reflectorization being confined centrally of the reflector 300. There further are indicated on the chart 350 points 357 that are disposed respectively 10° above and 10° below the longitudinal reflecting axis 306, points at which under the SAE specification for red Class A reflex reflectors, SAE standard J594c, at least 3.0 equivalent candlepowers of light must be reflected per foot-candle of incident light directed thereon. Point 358 identifies the point at which the above mentioned SAE specification requires that at least 4.5 equivalent candlepowers of light be reflected per foot-candle of incident light directed thereon. Finally. the points 359 lying to the left and right on the axis 306 are disposed at approximately 45° points at which at least 1.5 equivalent candlepowers of light are reflected per foot-candle of incident light thereon.

It will be understood that the reflector 300 of FIGS. 15 to 17 may be generally used in the same places as the reflectors 100 and 201 described above. More specifically, the reflector 300 satisfies all of the requirements for a Class A retrodirective or reflex reflector prescribed by the Society of Automotive Engineers, namely, those set forth in SAE Standard J594c. In addition, the reflector 300 is effective throughout a much wider entrance angle, namely, approximately 45° left and right of the centerline, in which wider entrance angle the reflector 300 provides 1.5 equivalent candlepowers of reflected light per foot-candle of incident light thereon.

Figure 18:
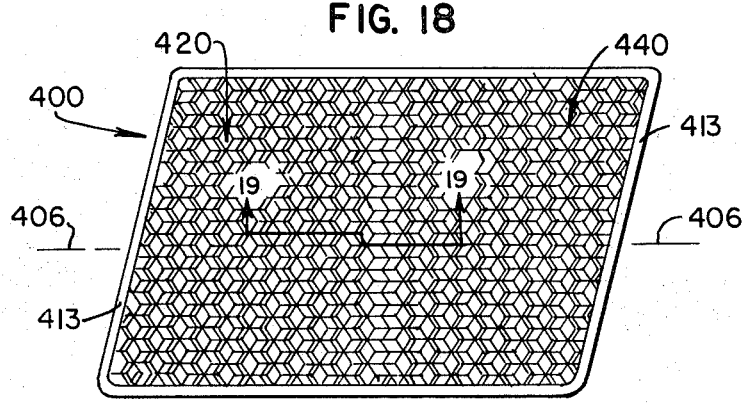
FIG. 18 is a plan view of another reflector made in accordance with the present invention.
Figure 19:
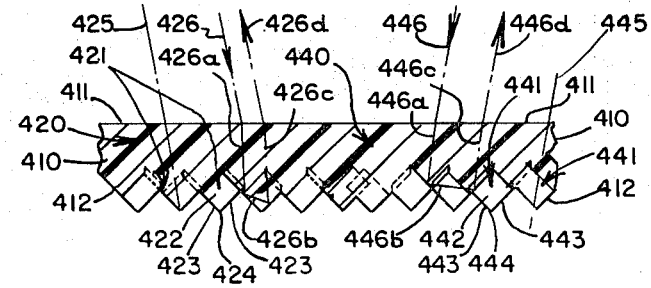
FIG. 19 is an enlarged fragmentary view in vertical section through the reflector of FIG. 18 along the line 19—19 thereof.
Figure 20:
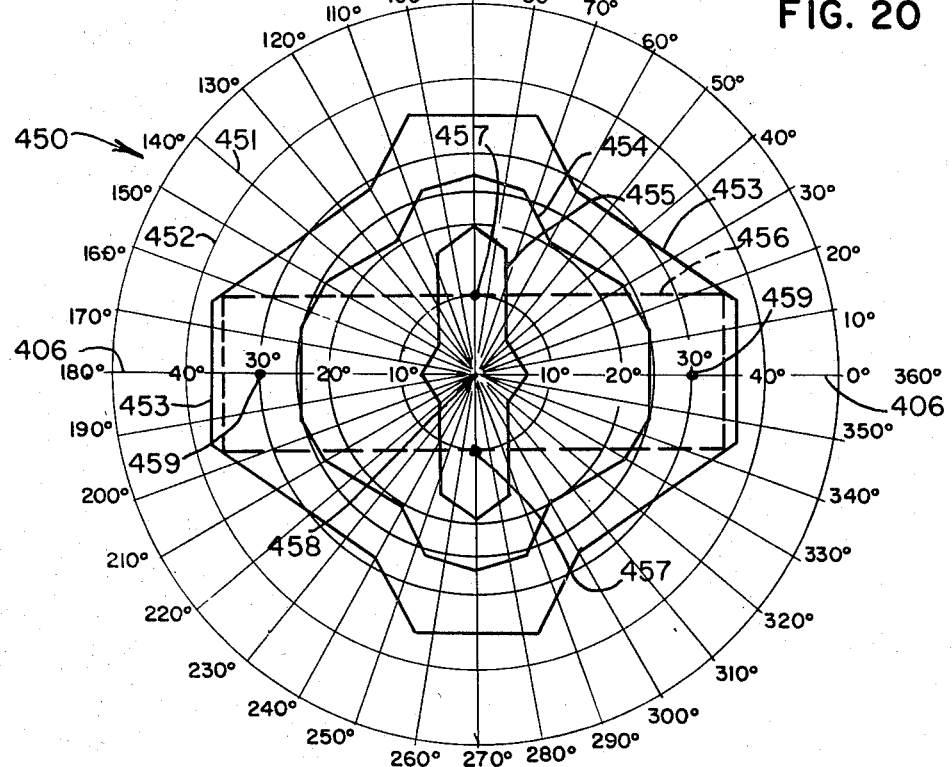
FIG. 20 is a diagram illustrating the performance of the reflector of FIGS. 18 and 19.

There is illustrated in FIGS. 18 and 19 of the drawings the construction of another form of reflector 400 made in accordance with and embodying the principles of the present invention, FIG. 20 of the drawings being a representation of a chart illustrating the performance of the reflector 400 when light from an oncoming vehicle is shined thereon. Referring to FIGS. 18 and 19, it will be seen that the reflector 400 includes a body 410 of a transparent material formed of a synthetic organic plastic resin, the preferred resin being a methyl methacrylate resin, a body of the resin being molded to provide a substantially flat front face 411, a configurated rear face 412 and a border or trim 413 extending completely therearound.

The reflector 400 is divided into two reflector sections 420 and 440. The first reflector section 420 is disposed to the left in FIGS. 18 and 19 and is formed as the left half of a parallelogram, and the second reflector section 440 is formed as the right half of the parallelogram. The construction of the reflector sections 420 and 440 are respectively the same as the reflector sections 320 and 340 of the reflector 300 except that the cube axes 425 and 445 are inclined at an angle of 10° with respect to a normal to the front face 411. Accordingly, the reflector section 420 is designed to receive an entering ray 426 that strikes the front face 411 at an angle from about 10° to the right through about 30° to the left with respect to a plane normal to the front face 411; and the reflector section 440 is designed to receive an entering ray 446 that strikes the front face 411 at an angle from about 10° to the left through about 30° to the right with respect to the plane normal to the front face 411.

The first reflector section 420 in effect provides a first zone of reflectorization inclined to the left as viewed in FIG. 19 approximately 15° with respect to a normal to the front face 411 of the reflector 400, and the second reflector section 440 in effect provides a second zone of reflectorization inclined to the right as viewed in FIG. 19 approximately 15° with respect to a normal to the front face 411 of the reflector 400, all directions being with respect to the longitudinal reflecting axis 406 of the reflector 400. The two zones of reflectorization are further arranged so that they overlap, thereby to give a continuous zone of reflectorization along the axis 406 through an included angle of approximately 60° and in a vertical direction 10° above and below a plane normal to the front face 411 and including the reflecting axis 406.

The response of the reflector 400 to light is shown in FIG. 20 and has the curves and points thereon labelled with the same reference numerals as the corresponding curves and points in the response of FIG. 6 but with a factor of 300 added thereto. It should be noted, however, that the curve 453 extends more than 30° on either side of the center of the reflector 400 in a horizontal direction and extends more than 30° up and down toward the center of the reflector 100; that the rectangle 456 extends slightly more than 30° on either side of the vertical center line of the reflector 400; and that the curve 454 has a horizontal extent of slightly more than 20° on either side of the vertical center line of the reflector 400 and extends slightly more than 20° vertically above and below the longitudinal reflecting axis 406.

Figure 21:
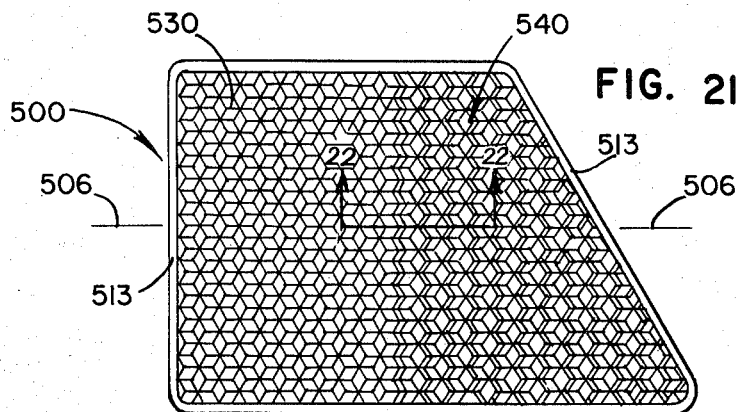
FIG. 21 is a plan view of another reflector made in accordance with the present invention.
Figure 22:
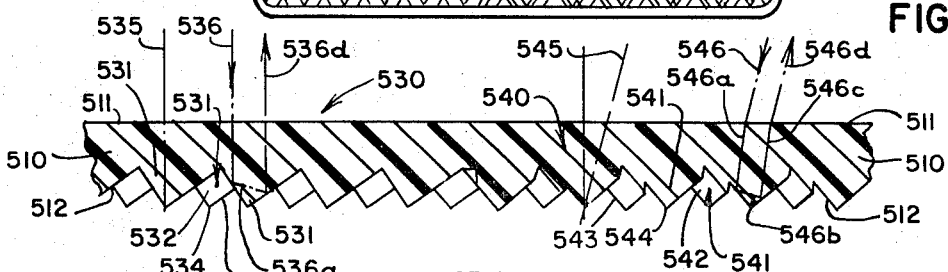
FIG. 22 is an enlarged fragmentary view in vertical section through the reflector of FIG. 21 along the line 22—22 thereof.

There is illustrated in FIGS. 21 and 22 of the drawings the construction of another reflector 500 preferably being formed of a methyl methacrylate resin and being molded to provide a substantially flat front face 511, a configurated rear face 512 and a border or trim 513 extending completely therearound.

The reflector 500 is divided into two sections, a lefthand section 530 and a righthand section 540. The lefthand reflector section 530 is generally rectangular in shape and has a construction like the section 220 of the reflector 201 shown in FIGS. 7 and 8, correspodning parts being labelled with corresponding reference numerals with a factor of 310 added thereto.

The second reflector section 540 is disposed to the right in FIGS. 21 and 22 and in plan view is shaped as a trapezoid. The section 540 has essentially the same construction as the reflecting section 340 of the reflector 300 shown in FIGS. 15 and 16, except that the cube axes 545 are disposed at an angle of approximately 20° with respect to a line normal to the front face 511 of the reflector 500. Parts of the reflector section 540 corresponding to the reflector section 340 are labelled with corresponding reference numerals with a factor of 200 added thereto.

The first section 530 in effect provides a first zone of reflectorization directed normal to the front face 511 of the reflector 500, and the second section 540 in effect provides a second zone of reflectorization inclined to the right as viewed in FIG. 8 approximately 23° with respect to a normal to the front face 511 of the reflector 500, all directions being with respect to the longitudinal reflecting axis 506 of the reflector 500. The two zones of reflectorization are further arranged so that they overlap, thereby to give a continuous zone of reflectorization along the axis 506 through an included angle of approximately 65° and in a vertical direction 10° above and below a plane normal to the front face 511 and including the reflecting axis 506.

Figure 23:
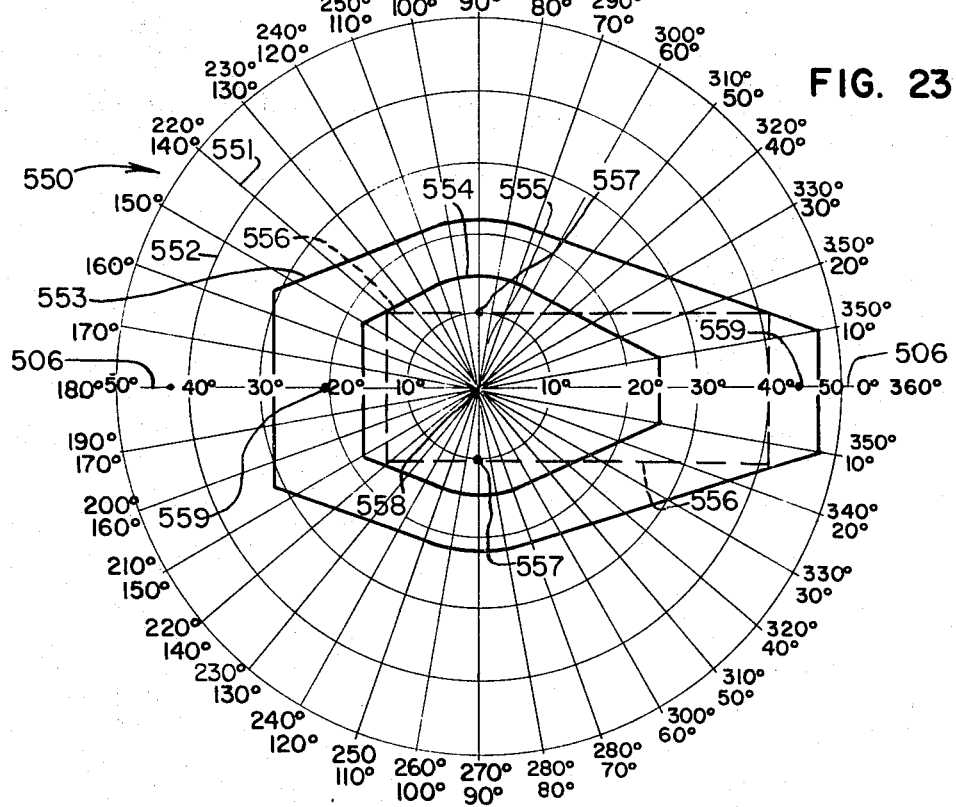
FIG. 23 is a diagram illustrating the performance of the reflector of FIGS. 21 and 22.

The response of the reflector 500 to light is shown in FIG. 23 and has curves and points thereon labeled with the same reference numerals as the corresponding curves and points in the response of FIG. 6 but with a factor of 400 added thereto. It should be noted, however, that the curve 553 extends slightly less than 30° to the left of the center of the reflector 500 in a horizontal direction and extends slightly less than 50° to the right of the center of the reflector 500 in a horizontal direction, and extends more than 10° up and down toward the right hand end of the reflector 500 and more than 15° up and down toward the left hand end of the reflector 500; that the rectangle 556 45° to the right and more than 20° to the left of the vertical centerline of the reflector 500 and 10° up and down from the horizontal axis 506 and that the curve 554 has a horizontal extent of slightly less than 30° to the right and slightly less than 20° to the left and extends vertically slightly less than 20° above and below the longitudinally reflecting axis 506.

Figure 24:
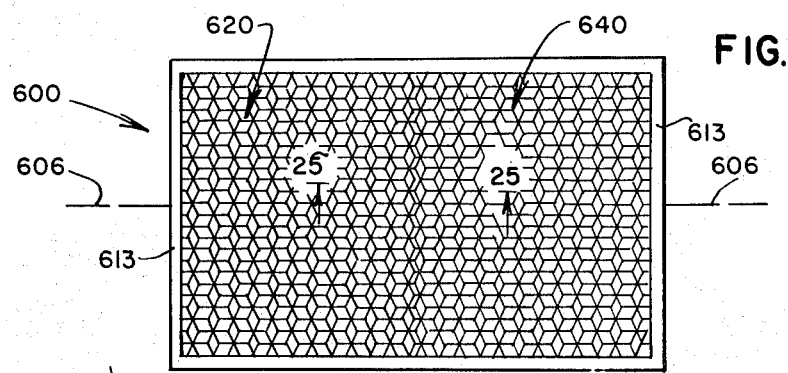
FIG. 24 is a plan view of still another reflector made in accordance with the present invention.
Figure 25:
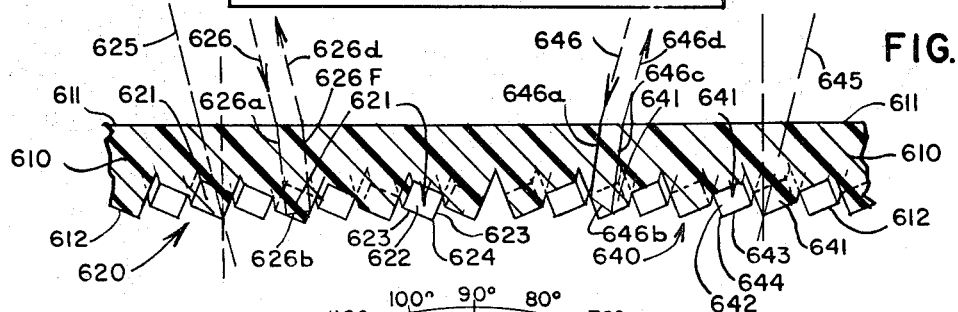
FIG. 25 is an enlarged fragmentary view in vertical section through the reflector of FIG. 24 along the line 25—25 thereof.

There is illustrated in FIGS. 24 and 25 of the drawings the construction of another reflector 600 preferably constructed of methyl methacrylate resin molded to provide a substantially flat front face 611, a configurated rear face 612 and a border or trim 613 extending completely therearound.

The reflector 600 is divided in two sections, a generally rectangular left hand section 620 and a generally rectangular right hand section 640. The construction of the reflector sections 620 and 640 are respectively the same as the reflector sections 120 and 140 of the reflector 100 except that the cube axes 625 and 645 are each inclined at an angle of 15° with respect to a normal to the front face 611. Accordingly, the reflector section 620 is designed to receive an entering ray 626 that strikes the front face 611 at an angle from about 0° to 45° to a line normal thereto; and the reflector section 640 is designed to receive an entering ray 646 that strikes the front face 611 at an angle from about 0° to about 45° with respect to the plane normal to the front face 611.

The first section 620 in effect provides a first zone of reflectorization inclined to the left as viewed in FIG. 25 approximately 23° with respect to a normal to the front face 611 of the reflector 600, and the second section 640 in effect provides a second zone of reflectorization inclined to the right as viewed in FIG. 25 approximately 23° with respect to a normal to the front face 611 of the reflector 600, all directions being with respect to the longitudinal reflecting axis 606 of the reflector 600. The two zones of reflectorization are further arranged so that they overlap, thereby to give a continuous zone of reflectorization along the axis 606 through an included angle of approximately 90° and in a vertical direction 10° above and below a plane normal to the front face 611 and including the reflecting axis 606.

Figure 26:
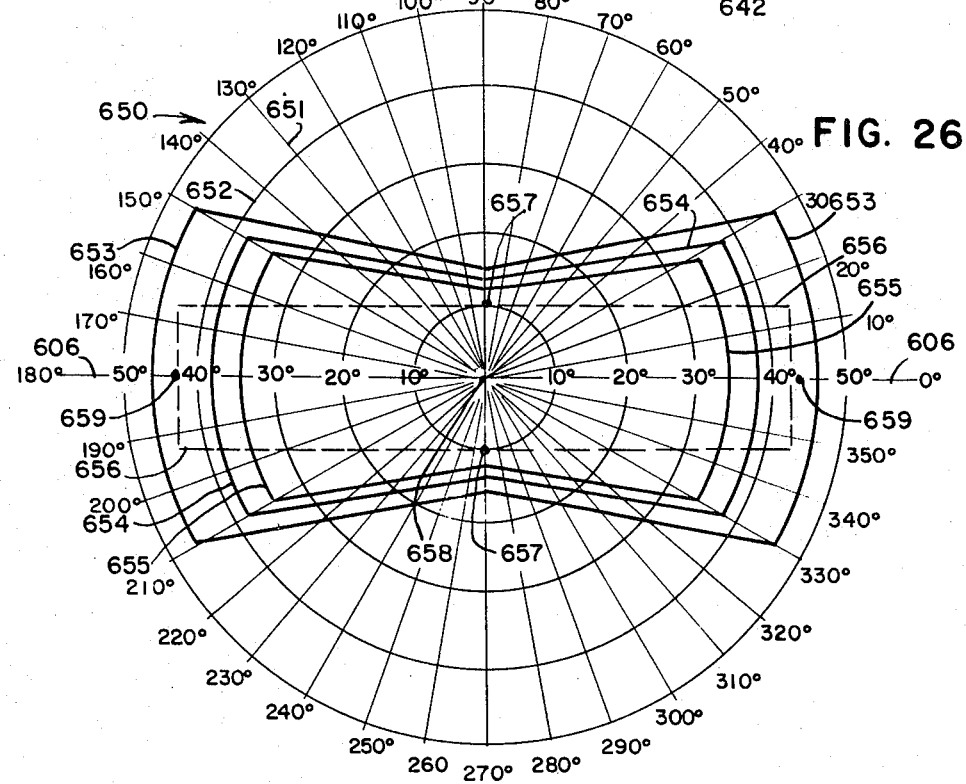
FIG. 26 is a diagram illustrating the performance of the reflector of FIGS. 24 and 25.

The response of the reflector 600 to light is shown in FIG. 26 and has the curves and points thereon labeled with the same reference numerals as the corresponding curves and points in the response of FIG. 6 but with a factor of 500 added thereto. It should be noted, however, that the curve 653 extends approximately 45° to the left of the center of the reflector 600 in a horizontal direction and extends approximately 45° to the right of the center of the reflector 600 in a horizontal direction, and extends more than 20° up and down toward the righthand end of the reflector 600 and more than 20° up and down toward the lefthand end of the reflector 600; that the rectangle 656 is 45° to the right and 45° to the left of the vertical center line of the reflector 600; and that the curve 654 has a horizontal extent of slightly less than 40° to the right and slightly less than 40° to the left and extends slightly more than 10° above and below the longitudinal reflecting axis 606.

There is illustrated in FIGS. 27 and 28 of the drawings the construction of a reflector 700 preferably being formed of a methyl methacrylate resin being molded to provide a substantially flat front face 711, a configurated rear face 712 and a border or rim 713 extending completely therearound.

The reflector 700 is more specifically divided into three sections 720, 730 and 740. The first reflector section 720 is shaped like a trapezoid and has a construction of the same as the reflector section 320 of the reflector 300 in section 15. The second reflector section 730 is constructed like the reflector section 130 and the reflector 100. The reflector section 740 is trapezoidal in shape and is constructed the same as the reflector section 140 of the reflector 100 except that the cube axes 745 are each inclined at an angle of approximately 20° with respect to a normal to the front face 711, whereby the reflector section 740 is particularly designed to receive an entering ray 746 from the right that strikes the front face 711 at an angle from about 15° to about 45° with respect to a plane normal to a front face 711.

The first reflector section 720 in effect provides a first zone of reflectorization inclined to the left as viewed in FIG. 28 approximately 23° with respect to a normal to the front face 711 of the reflector 700, the second reflector section 730 provides a second zone of reflectorization directed normal to the front face 711 of the reflector 700, and the third reflector section 740 in effect provides a third zone of reflectorization inclined to the right as viewed in FIG. 28 approximately 23° with respect to a normal to the front face 711 of the reflector 700, all directions being with respect to the longitudinal reflecting axis 706 of the reflector 700. The several zones of reflectorization are further arranged so that the first and second zones of reflectorization overlap and the second and third zones of reflectorization overlay, thereby to give a continuous zone of reflectorization along the axis 706 through an included angle of approximately 90° and in a vertical direction 10° above and below a plane normal to the front face 711 and including the reflecting axis 706.

The response of the reflector to light is shown in FIG. 29 and has the curves and points thereon labeled with the same reference numerals as the corresponding curves and points in the response of FIG. 6 but with a factor of 600 added thereto. It should be noted, however, that the curve 653 extends approximately 45° on either side of the center of the reflector 700 in a horizontal direction and extends more than 20° up and down toward the center of the reflector 200 and more than 10° up and down toward the outer ends of the reflector 700; that the rectangle 756 extends 45° on either side of the vertical center line of the reflector 700 and 10° up and down from the horizontal axis 706; and that the curve 754 has a horizontal extent slightly more than 25° to the left and 20° to the right of the vertical centerline of the reflector 700 and extends vertically approximately 15° above and below the longitudinal reflecting axis 706.

In the several reflectors described hereinabove, the cube axes or optical axes of certain of the reflector elements have been inclined at acute angles with respect to the normal to the front face of the reflectors. It has been found that in accordance with the present invention, the cube axes or optical axes may be inclined at an acute angle with respect to the normal to the front face of the reflector in the range from about 8° to about 30°, and still provide the necessary overlapping of the several zones of reflectorization provided by the several reflector sections in each reflector, all while maintaining the standards prescribed by SAE Standard J594c, but maintaining such standards through a much wider entrance angle of at least 60° and up to as much as 100° along the longitudinal reflecting axis of the reflector.

From the above it will be seen that there have been provided an improved reflectorized vehicle, such as an automobile, and improved reflectors for accomplishing the reflectorization of automobiles which fulfill all of the objects and advantages set forth above.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. A reflector for reflecting therefrom throughout a wide external incident angle along a longitudinal reflecting axis light falling thereon to reflect the light back toward the source thereof to render the reflector highly visible at night, said reflector comprising a body of transparent material having a substantially flat front face and a rear face, a first group of retrodirective reflector elements on said body in a first section of said rear face, a second group of retrodirective reflector elements on said body in a second section of said rear face, said first group of reflector elements having the optical axes thereof disposed substantially parallel to each other and disposed at a first predetermined angle measured in a given direction from said front face, thereby to provide along said longitudinal reflecting axis a first zone of reflectorization wherein at least about 1.5 equivalent candlepowers of light are reflected per foot-candle of incident light directed thereon, said second group of reflector elements having the optical axes thereof disposed substantially parallel to each other and disposed at a second different predetermined angle measured in said given direction from said front face, thereby to provide along said longitudinal reflecting axis a second zone of reflectorization wherein at least about 1.5 equivalent candlepowers of light are reflected per foot-candle of incident light directed thereon, said first and second zones of reflectorization at least partially overlapping to provide a combined zone of reflectorization having an angular extent along said longitudinal reflecting axis and substantially normal to said front face of at least about 60°, thereby to provide a wide external incident angle for said reflector along said longitudinal reflecting axis.

2. The reflector set forth in claim 1, wherein the optical axes of the reflector elements in said first group are disposed substantially normal to said front face, and the optical axes of the reflector elements in said second group are disposed at an acute angle with respect to the normal to said front face in the range from about 8° to 30°.

3. The reflector set forth in claim 1 wherein the optical axes of the reflector elements in said first group are inclined in one direction along said longitudinal reflecting axis at an angle with respect to the normal to said front face in the range from about 8° to about 30°, and the optical axes of the reflector elements in said second group are inclined in the other direction along said longitudinal reflecting axis at an angle with respect to the normal to said front face in the range from about 8° to about 30°.

4. A reflector for reflecting therefrom throughout a wide external incident angle along a longitudinal reflecting axis light falling thereon to reflect light back toward the source thereof to render the reflector highly visible at night, said reflector comprising a body of transparent material having a substantially flat front face and a rear face, a first group of cube corner reflector elements on said body in a first section of said rear face, a second group of cube corner reflector elements on said body in a second section of said rear face, said first group of reflector elements having the cube axes thereof disposed substantially parallel to each other and disposed at a first predetermined angle measured in a given direction from said front face, thereby to provide along said longitudinal reflecting axis a first zone of reflectorization wherein at least about 1.5 equivalent candlepowers of light are reflected per foot-candle of incident light directed thereon, said second group of reflector elements having the cube axes thereof disposed substantially parallel to each other and disposed at a second different predetermined angle measured in a given direction from said front face, thereby to provide along said longitudinal reflecting axis a second zone of reflectorization wherein at least about 1.5 equivalent candlepowers of light are reflected per foot-candle of incident light directed thereon, said first and second zones of reflectorization at least partially overlapping to provide a combined zone of reflectorization having an angular extent along said longitudinal reflecting axis and substantially normal to said front face of at least about 60°, thereby to provide a wide external incident angle for said reflector along said longitudinal reflecting axis.

5. A reflector for reflecting therefrom throughout a wide external incident angle along a longitudinal reflecting axis light falling thereon to reflect the light back toward the source thereof to render the reflector highly visible at night, said reflector comprising a body of transparent material having a substantially flat front face and a rear face, a first group of retrodirective reflector elements on said body in a first section of said rear face, a second group of retrodirective reflector elements on said body in a second section of said rear face, a third group of retrodirective reflector elements on said body in a third section of said rear face, said first group of reflector elements having the optical axes thereof disposed substantially parallel to each other and disposed at a first predetermined angle measured in a given direction from said front face, thereby to provide along said longitudinal reflecting axis a first zone of reflectorization wherein at least about 1.5 equivalent candlepowers of light are reflected per foot-candle of incident light directed thereon, said second group of reflector elements having the optical axes thereof disposed substantially parallel to each other and disposed at a second different predetermined angle measured in said given direction from said front face, thereby to provide along said second longitudinal reflecting axis a second zone of reflectorization wherein at least about 1.5 equivalent candlepowers of light are reflected per foot-candle of incident light directed thereon, said third group of reflector elements having the optical axes thereof disposed substantially parallel to each other and disposed at a third different predetermined angle measured in said given direction from said front face, thereby to provide along said longitudinal reflecting axis a third zone of reflectorization wherein at least about 1.5 equivalent candlepowers of light are reflected per foot-candle of incident light directed thereon, said first and second and third zones of reflectorization at least partially overlapping to provide a combined zone of reflectorization having an angular extent along said longitudinal reflecting axis and substantially normal to said front face of at least about 80°, thereby to provide a wide external incident angle for said reflector along said longitudinal reflecting axis.

6. A reflector for reflecting therefrom throughout a wide external incident angle along a longitudinal reflecting axis light falling thereon to reflect light back toward the source thereof to render the reflector highly visible at night, said reflector comprising, a body of transparent material having a substantially flat front face and a rear face, a first group of cube corner reflector elements on said body in a first section of said rear face, a second group of cube corner reflector elements on said body in a second section of said rear face, a third group of cube corner reflector elements on said body in a third section of said rear face, said first group of reflector elements having the cube axes thereof disposed substantially parallel to each other and disposed at a first predetermined angle measured in a given direction from said front face, thereby to provide along said longitudinal reflecting axis a first zone of reflectorization wherein at least about 1.5 equivalent candlepowers of light are reflected per foot-candle of incident light directed thereon, said second group of reflector elements having a cube axes thereof disposed substantially parallel to each other and disposed at a second different predetermined angle measured in said given direction from said front face, thereby to provide along said longitudinal reflecting axis a second zone of reflectorization wherein at least about 1.5 equivalent candlepowers of light are reflected per foot-candle of incident light thereon, said third group of reflector elements having the cube axes thereof disposed substantially parallel to each other and disposed at a third different predetermined angle measured in said given direction from said front face, thereby to provide along said longitudinal reflecting axis a third zone of reflectorization wherein at least about 1.5 equivalent candlepowers of light are reflected per foot-candle of incident light thereon, said first and second and third zones of reflectorization at least partially overlapping to provide a combined zone of reflectorization having an angular extent along said longitudinal reflecting axis and substantially normal to said front face of at least bout 80°, thereby to provide a wide external incident angle for said reflector along said longitudinal reflecting axis.

7. A reflectorized vehicle comprising a body having a pair of longitudinally extending sides and a back extending between said sides, a pair of forward side reflectors mounted respectively on said sides adjacent to the front thereof, a pair of rearward side reflectors mounted respectively on said sides adjacent to the rear thereof, and a pair of back reflectors mounted on said back and disposed respectively outwardly toward said sides, said reflectors providing a zone of reflectorization extending rearwardly from points disposed at points 20° forwardly of a plane passing through said forward side reflectors and along said sides and along said back, each of said reflectors comprising a body of transparent material having a substantially flat front face and a rear face, a first group of retrodirective reflector elements on said body in a first section of said rear face, a second group of retrodirective reflector elements on said body in a second section of said rear face, said first group of reflector elements having the optical axes thereof disposed substantially parallel to each other and disposed at a first predetermined angle measured in a given direction from said front face, thereby to provide along a longitudinal reflecting axis of said reflector a first zone of reflectorization wherein at least about 1.5 equivalent candlepowers of light are reflected per foot-candle of incident light directed thereon, said second group of reflector elements having the optical axes thereof disposed substantially parallel to each other and disposed at a second different predetermined angle measured in said given direction from said front face, thereby to provide along said longitudinal reflecting axis a second zone of reflectorization wherein at least about 1.5 equivalent candlepowers of light are reflected per foot-candle of incident light directed thereon, said first and second zones of reflectorization at least partially overlapping to provide a combined zone of reflectorization having an angular extent along said longitudinal reflecting axis and substantially normal to said front face of at least about 60°.

8. The reflector set forth in claim 4, wherein the cube axes and an edge of each of the reflector elements in both of said groups lie in a plane substantially parallel to said longitudinal reflecting axis.

9. The reflector set forth in claim 4, wherein the cube axes of the reflector elements in said first group are disposed substantially normal to said front face, and the cube axes of the reflector elements in said second group are inclined at an acute angle with respect to a normal to said front face in the range from about 8° to about 30° and arranged so that an edge of each of the reflector elements in said second group is more nearly parallel to said front face than is any face of each of the reflector elements in said second group.

10. The reflector set forth in claim 4, wherein the cube axes of the reflector elements in said first group are disposed substantially normal to said front face, and the cube axes of the reflector elements in said second group are inclined at an acute angle with respect to a normal to said front face in the range from about 8° to about 30° and arranged so that a face of each of the reflector elements in said second group is more nearly parallel to said front face than is any edge of each of the reflector elements in said second group.

11. The reflector set forth in claim 4, wherein the cube axes of the reflector elements in said first group are inclined in one direction along said longitudinal reflecting axis at an acute angle with respect to a normal to said front face in the range from about 8° to about 30° and arranged so that an edge of each of the reflector elements in said first group is more nearly parallel to said front face than is any face of each of the reflector elements in said first group, and the cube axes of the reflector elements in said second group are inclined in the other direction along said longitudinal reflecting axis at an acute angle with respect to the normal to said front face in the range from about 8° to about 30° and arranged so that an edge of each of the reflector elements in said second group is more nearly parallel to said front face than is any face of each of the reflector elements in said second group.

12. The reflector set forth in claim 4, wherein the cube axes of the reflector elements in said first group are inclined in one direction along said longitudinal reflecting axis at an angle with respect to a normal to said front face in the range from 8° to about 30° and arranged so that a face of each of the reflector elements in said first group is more nearly parallel to said front face than is any edge of each of the reflector elements in said first group, and the cube axes of the reflector elements in said second group are inclined in the other direction along said longitudinal reflecting axis at an angle with respect to the normal to said front face in the range from about 8° to about 30° and arranged so that a face of each of the reflector elements in said second group is more nearly parallel to said front face than is any edge of each of the reflector elements in said second group.

13. The reflector set forth in claim 6, wherein the cube axes and an edge of each of the reflector elements in all of said groups lie in a plane substantially parallel to said longitudinal reflecting axis.

14. The reflector set forth in claim 6, wherein the cube axes of the reflector elements in said first group are inclined in one direction along said longitudinal reflecting axis at an angle with respect to a normal to said front face in the range from about 8° to about 30° and arranged so that an edge of each of the reflector elements in said first group is more nearly parallel to said front face than is any face of each of the reflector elements in said first group, the cube axes of the reflector elements in said second group are disposed substantially normal to said front face, and the cube axes of the reflector elements in said third group are inclined in the other direction along said longitudinal reflecting axis at an angle with respect to the normal to said front face in the range from 8° to about 30° and arranged so that an edge of each of the reflector elements in said third group is more nearly parallel of said front face than is any face of each of the reflector elements in said third group.

15. The reflector set forth in claim 6, wherein the cube axes of the reflector elements in said first group are inclined in one direction along said longitudinal reflecting axis at an angle with respect to a normal to said front face in the range from about 8° to about 30° and arranged so that a face of each of the reflector elements in said first group is more nearly parallel to said front face than is any edge of each of the reflector elements in said first group, the cube axes of the reflector elements in said second group are disposed substantially normal to said front face, and the cube axes of the reflector elements in said third group are inclined in the other direction along said longitudinal reflecting axis at an angle with respect to the normal to said front face in the range from about 8° to about 30°, and arranged so that a face of each of the reflector elements in said third group is more nearly parallel to said front face than is any edge of each of the reflector elements in said third group.

16. The reflector set forth in claim 6, wherein the cube axes of the reflector elements in said first group are inclined in one direction along said longitudinal reflecting axis at an angle with respect to a normal to said front face in the range from about 8° to about 30° and arranged so that an edge of each of the reflector elements in said first group is more nearly parallel to said front face than is any face of each of the reflector elements in said first group, the cube axes of the reflector elements in said second group are disposed substantially normal to said front face, and the cube axes of the reflector elements in said third group are inclined in the other direction along said longitudinal reflecting axis at an angle with respect to the normal to said front face in the range from about 8° to about 30° and arranged so that a face of each of the reflector elements in said third group is more nearly parallel to said front face than is any edge of each of the reflector elements in said third group.

17. The reflector set forth in claim 6, wherein the cube axes of the reflector elements in said second group are disposed substantially normal to said front face, one of the edges of each of approximately one-half of the reflector elements in said second group are inclined in one direction along said longitudinal reflecting axis and are disposed in a plane parallel thereto, and one of the edges of each of the other half of the reflector elements in said second group are inclined in the other direction along said longitudinal reflecting axis and are disposed in a plane parallel thereto.

References Cited

UNITED STATES PATENTS

| | | | |
|---|---|---|---|
| 655,220 | 8/1900 | Fugman | 350—103 |
| 1,892,860 | 1/1933 | Wehr, et al. | 350—97 |
| 1,943,440 | 1/1934 | Horni | 350—107 |
| 2,153,634 | 4/1939 | Magarian | 350—103 X |
| 2,117,201 | 5/1938 | Miller | 350—109 |
| 2,216,325 | 10/1940 | Ryder | 350—103 |
| 2,949,058 | 8/1960 | Daly | 350—97 X |
| 2,981,149 | 4/1961 | Stolarczyk, et al. | 350—107 X |
| 3,119,894 | 1/1964 | Nagel, et al. | 350—103 |
| 1,455,306 | 5/1923 | Reilley, et al. | 350—99 |
| 2,685,231 | 8/1954 | Onksen | 350—103 X |
| 2,723,595 | 11/1955 | Rupert | 350—103 |
| 3,258,840 | 7/1966 | Hedgewick, et al. | 264—1 XR |

FOREIGN PATENTS

| | | |
|---|---|---|
| 825,317 | 3/1938 | France. |

PAUL R. GILLIAM, Primary Examiner